(12) United States Patent
Nishida

(10) Patent No.: US 9,965,228 B2
(45) Date of Patent: May 8, 2018

(54) INFORMATION PROCESSING SYSTEM, INFORMATION PROCESSING METHOD AND NON-TRANSITORY COMPUTER READABLE INFORMATION RECORDING MEDIUM

(71) Applicant: Takayori Nishida, Tokyo (JP)

(72) Inventor: Takayori Nishida, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days. days.

(21) Appl. No.: 14/888,624

(22) PCT Filed: May 1, 2014

(86) PCT No.: PCT/JP2014/062539
§ 371 (c)(1),
(2) Date: Nov. 2, 2015

(87) PCT Pub. No.: WO2014/181884
PCT Pub. Date: Nov. 13, 2014

(65) Prior Publication Data
US 2016/0070511 A1 Mar. 10, 2016

(30) Foreign Application Priority Data
May 10, 2013 (JP) .................................. 2013-099973

(51) Int. Cl.
*G06F 3/12* (2006.01)
*H04N 1/00* (2006.01)
(Continued)

(52) U.S. Cl.
CPC .......... *G06F 3/1222* (2013.01); *G06F 3/1204* (2013.01); *G06F 3/1238* (2013.01);
(Continued)

(58) Field of Classification Search
None
See application file for complete search history.

(56) References Cited

U.S. PATENT DOCUMENTS 8,139,564 B1 * 3/2012 Weaver ............... H04L 29/1216
370/352
8,760,729 B2 6/2014 Oseto et al.
(Continued)

FOREIGN PATENT DOCUMENTS

EP 2075984 A1 7/2009
JP 2001-051915 2/2001
(Continued)

OTHER PUBLICATIONS

Extended European Search Report dated Mar. 29, 2016 issued in corresponding European Application No. 14794475.5.
(Continued)

*Primary Examiner* — Fan Zhang
(74) *Attorney, Agent, or Firm* — Harness, Dickey & Pierce, P.L.C.

(57) ABSTRACT

An information processing system includes one or more information processing apparatuses. The information processing system includes an output data reception part that receives, via a network, output data or output target data; a storage process part that associates data identification information with the output data and stores them in a data storage part when the output data reception part receives the data identification information for the output data or output data generated based on the output target data or a request to issue the data identification information; a notification part that notifies of the data identification information via a network; and a transmission part that transmits, via a network, the output data associated with the user identification information received via a network.

19 Claims, 28 Drawing Sheets

(51) Int. Cl.
  *H04N 1/32* (2006.01)
  *H04N 1/44* (2006.01)
(52) U.S. Cl.
  CPC .......... *G06F 3/1267* (2013.01); *G06F 3/1288* (2013.01); *H04N 1/0023* (2013.01); *H04N 1/00233* (2013.01); *H04N 1/00244* (2013.01); *H04N 1/32106* (2013.01); *H04N 1/444* (2013.01); *H04N 1/4413* (2013.01); *H04N 2201/0082* (2013.01); *H04N 2201/3212* (2013.01); *H04N 2201/3221* (2013.01); *H04N 2201/3278* (2013.01)

(56) References Cited

U.S. PATENT DOCUMENTS

| | | | |
|---|---|---|---|
| 9,001,348 B2 | 4/2015 | Nishida | |
| 9,081,528 B2 | 7/2015 | Nishida | |
| 9,218,146 B2 | 12/2015 | Nishida et al. | |
| 9,591,182 B2 | 3/2017 | Nishida | |
| 2001/0017712 A1* | 8/2001 | Kasatani | H04L 51/18 358/1.15 |
| 2004/0001226 A1* | 1/2004 | Ohtuka | G06F 3/1292 358/1.15 |
| 2008/0106760 A1 | 5/2008 | Ohtuka | |
| 2008/0220875 A1* | 9/2008 | Sohl | G07F 17/3276 463/42 |
| 2009/0122334 A1 | 5/2009 | Soneoka | |
| 2009/0172175 A1 | 7/2009 | Yanagi | |
| 2012/0268770 A1 | 10/2012 | Fukuda | |
| 2012/0274982 A1* | 11/2012 | Yabe | H04N 1/00212 358/1.15 |
| 2013/0094053 A1 | 4/2013 | Shirai | |
| 2014/0211233 A1* | 7/2014 | Biswal | G06F 3/1238 358/1.14 |
| 2014/0337445 A1 | 11/2014 | Nishida | |

FOREIGN PATENT DOCUMENTS

| | | |
|---|---|---|
| JP | 2004-088726 | 3/2004 |
| JP | 2004-236348 | 8/2004 |
| JP | 2012-224000 | 11/2012 |
| JP | 2012-248006 | 12/2012 |
| JP | 2014-016979 | 1/2014 |
| JP | 2014-219892 | 11/2014 |
| JP | 2014-219893 | 11/2014 |
| WO | WO2014/181759 A1 | 11/2014 |

OTHER PUBLICATIONS

International Search Report dated Aug. 19, 2014 in PCT/JP2014/062539 filed May 1, 2014.

* cited by examiner

FIG.6

| USER NAME | PASSWORD | CARD ID | MAIL ADDRESS | ..... |
|---|---|---|---|---|
| A | ..... | ..... | aaa@xxxxx | ..... |
| B | ..... | ..... | bbb@xxxxx | ..... |
| .. | .. | .. | .. | .. |

| JOB NAME | USER MODE | USER NAME | PIN CODE | PRINT DATA | ..... |
|---|---|---|---|---|---|
| XXX | G | | 1234 | ..... | ..... |
| YYY | U | A | | ..... | ..... |
| .. | .. | .. | .. | .. | .. |

| MAIL ADDRESS | PIN CODE |
|---|---|
| xxx01@yyy01.zzz01 | 1111 |
| xxx02@yyy02.zzz02 | 12345 |
| xxx03@yyy03.zzz03 | 42321 |
| xxx04@yyy04.zzz04 | 3126 |
| xxx05@yyy05.zzz05 | 74342 |
| xxx06@yyy06.zzz06 | 52754 |
| xxx07@yyy07.zzz07 | 6341 |

FIG.13

| COMPANY CODE | RECEIVING ADDRESS |
|---|---|
| COMPANY 1 | office1@cloud.co.jp |
| COMPANY 2 | office2@cloud.co.jp |
| COMPANY 3 | office3@cloud.co.jp |
| : | : |

FIG.14

| JOB NAME | USER MODE | USER NAME | PIN CODE | PRINT DATA | COMPANY CODE | ... |
|---|---|---|---|---|---|---|
| XXX | G | | 1234 | ... | COMPANY 1 | ... |
| YYY | U | A | | ... | COMPANY 2 | ... |
| .. | .. | .. | .. | .. | .. | .. |

| COMPANY CODE | APPARATUS ID |
|---|---|
| COMPANY 1 | ... |
| COMPANY 1 | ... |
| : | : |
| COMPANY 2 | ... |
| : | : |

| ORGANIZATION CODE | MAIL ADDRESS | PIN CODE |
|---|---|---|
| XXX | xxx01@yyy01.zzz01 | 1111 |
| YYY | xxx02@yyy02.zzz02 | 12345 |
| YYY | xxx03@yyy03.zzz03 | 42321 |
| XXX | xxx04@yyy04.zzz04 | 3126 |
| XXX | xxx05@yyy05.zzz05 | 74342 |
| YYY | xxx06@yyy06.zzz06 | 52754 |
| XXX | xxx07@yyy07.zzz07 | 6341 |

| ORGANIZATION CODE | USER NAME | PASSWORD | CARD ID | MAIL ADDRESS | ROLE | ..... 733 |
|---|---|---|---|---|---|---|
| COMPANY 1 | A | ..... | ..... | aaa@xxxxx | ADMINISTRATOR | ..... |
|  | B | ..... | ..... | bbb@xxxxx | USER | ..... |
| COMPANY 2 | .. | .. | .. | .. | .. | .. |

FIG.28

| ORGANIZATION CODE | USER NAME | PASSWORD |
|---|---|---|
| XXX | A | ... |
| YYY | B | ... |

INFORMATION PROCESSING SYSTEM, INFORMATION PROCESSING METHOD AND NON-TRANSITORY COMPUTER READABLE INFORMATION RECORDING MEDIUM

TECHNICAL FIELD

The present invention relates to an information processing system, an information processing method and a non-transitory computer readable information recording medium.

BACKGROUND ART

In the related art, there is a system in which, in response to a print instruction that is input into a Personal Computer (PC) or the like by a user, instead of print data being printed immediately, the print data is associated with the user name and is stored in a storage device of a predetermined server or image forming apparatus. Then, when the user inputs the user name and a password through an operation panel of the image forming apparatus, the image forming apparatus carries out authentication using the user name and the password. When the authentication is successful, the image forming apparatus displays, on the operation panel, list information including print data associated with the user name from among print data stored in the storage device. The image forming apparatus obtains, from the storage device, print data that is selected from the list information and carries out printing.

By such a system, printed matter is output when the user is beside the image forming apparatus. Therefore, it is possible to prevent the printed matter from being left as it is on the image forming apparatus or taken by another person. As a result, it is possible to ensure security of the printed information.

SUMMARY OF INVENTION

According to one aspect, an information processing system includes one or more information processing apparatuses. The information processing system includes an output data reception part that receives, via a network, output data or output target data; a storage process part that associates data identification information with the output data and stores them in a data storage part when the output data reception part receives the data identification information for the output data or output data generated based on the output target data or a request to issue the data identification information; a notification part that notifies of the data identification information via a network; and a transmission part that transmits, via a network, the output data associated with the user identification information received via a network.

Other objects, features and advantages of the present invention will become more apparent from the following detailed description when read in conjunction with the accompanying drawings.

BRIEF DESCRIPTION OF DRAWINGS

FIG. 6 shows a configuration example of a user information storage part;
FIG. 7 shows a configuration example of a print information storage part according to the first embodiment;
FIG. 9 shows a configuration example of a PIN code storage part;
FIG. 13 shows a configuration example of an address associated information storage part;
FIG. 14 shows a configuration example of a print information storage part according to the second embodiment;
FIG. 15 shows a configuration example of a user apparatus information storage part;
FIG. 20 shows a configuration example of the PIN code storage part according to the fourth embodiment;
FIG. 21 shows a configuration example of a user information storage part according to the fourth embodiment;
FIG. 28 shows a configuration example of a proxy account management table.

DESCRIPTION OF EMBODIMENTS

First, for the sake of convenience of explanation, a problem to be solved by the embodiments of the present invention will be described.

In the above-mentioned system in the related art, only a user who previously has his or her account for receiving authentication can carry out printing. Therefore, for example, a visitor or the like who does not have such an account requests a person who has such an account to carry out printing. Thus, inconvenience may occur. There can be a way of providing a common guest account to the visitor or the like. However, in this way, since the common guest account is given to a plurality of visitors, one visitor can manipulate print data of another visitor. As a result, the above-mentioned advantage obtained from the system of ensuring security of printed information may be degraded.

Further, there can be another way by providing an image forming apparatus for guests. However, in this way, an economic burden increases and extra installation space is necessary. Therefore, it may be difficult to say this way is excellent.

The embodiments of the present invention have been devised in consideration of the point and an objective of the embodiments is to make it possible to give output authorization for a user who does not have an account for outputting data.

Figure 1:
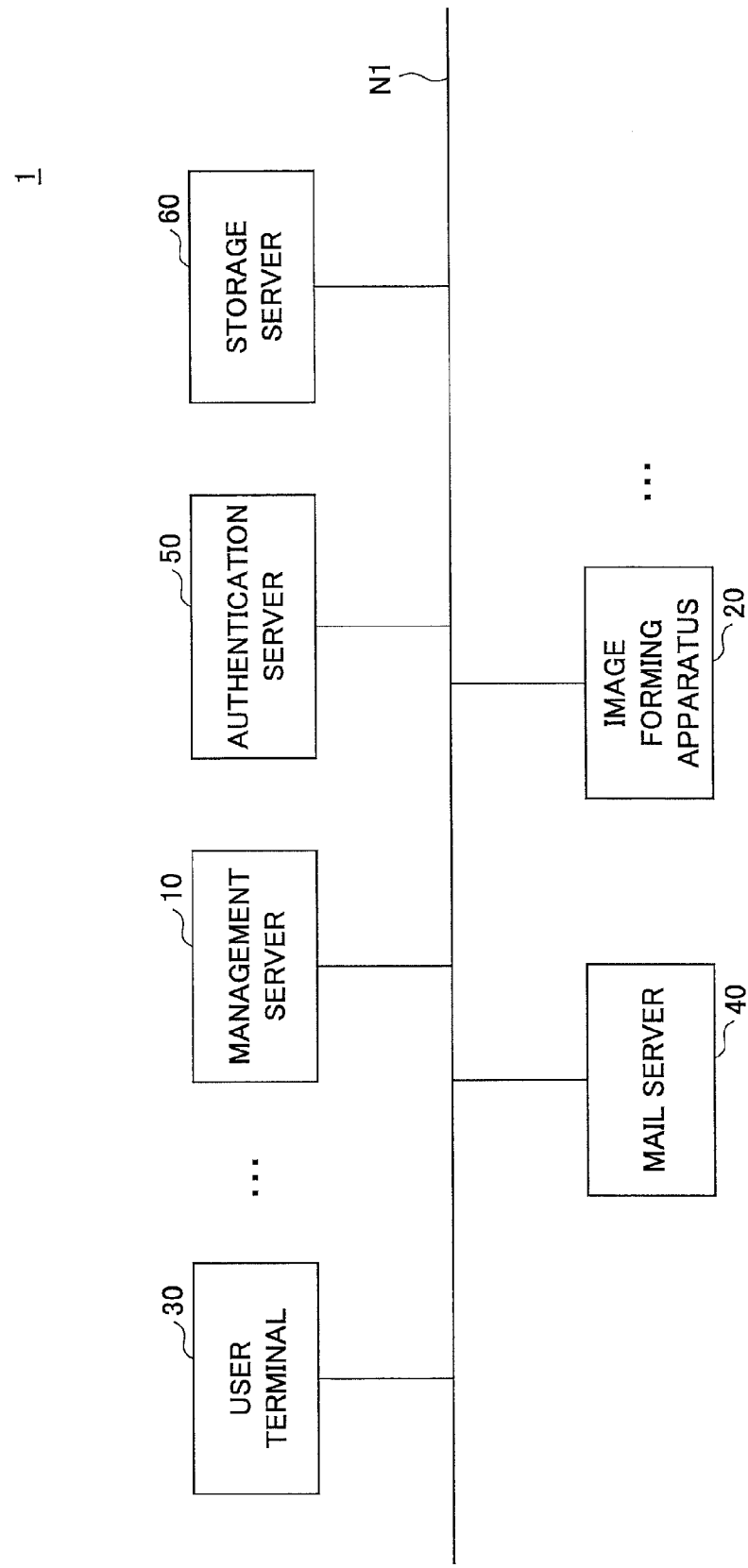
FIG. 1 shows a configuration example of a print system according to a first embodiment.

Below, based on the drawings, the embodiments of the present invention will be described. FIG. 1 shows a configuration example of a print system according to the first embodiment. In a print system 1 shown in FIG. 1, one or more user terminals 30, a mail server 40, a management server 10, an authentication server 50, a storage server 60 and one or more image forming apparatuses 20 are connected together via a network N1 such as a Local Area Network (LAN) or the Internet in a manner of implementing mutual communication. A part or the entire network N1 can be a wireless communication network. Between the user terminals 30 and the network N1, a mobile communication network can be inserted. It is assumed that the print system 1 is operated in an organization of a company or the like. According to the first embodiment, the organization will be referred to as a "company A".

The user terminals 30 are information processing apparatuses directly operated by corresponding users of the print system 1. For example, the user operates the user terminals 30 and inputs a print request for the print system 1. Examples of the user terminals 30 can be PCs, portable phones, smartphones, tablet-type terminals, Personal Digital Assistances (PDAs) and so forth. The respective ones of the plurality of user terminals 30 can be those of mutually different types.

Note that according to the first embodiment, the users of the print system 1 include "authorized users" and "guest users". The authorized users are users whose information is registered in the print system 1 (strictly speaking, in a user information storage part 52, described later). In other words, the authorized users are users who are expected as users of the print system 1. Examples of the authorized users can be employees of the company A. The guest users are users whose information is not registered in the print system 1. In other words, the guest users originally have no use authorization for the print system 1. Examples of the guest users can be persons other than the employees of the company A.

The mail server 40 is a computer that transfers electronic mails transmitted from the user terminals 30, electronic mails transmitted from the management server 10 and so forth. For example, the user terminal 30 transmits, according to a users' instruction, an electronic mail including a print request for the management server 10. Electronic data to be printed is attached to the electronic mail that includes the print request. The data format of the electronic data is not limited to be a predetermined one. Below, an electronic mail including a print request transmitted from the user terminal 30 will be referred to as a "print request mail", hereinafter.

The authentication server 50 is a computer that manages information for each of the users (hereinafter, referred to as "user information") of the company A and carries out a process using the user information. For example, the authentication server 50 carries out an authentication process in response to an authentication request in which a user name, a password and/or the like are designated. Further, the authentication server 50 carries out processes in response to a presence confirmation request for a mail address and a request for obtaining a user name corresponding to a mail address. That is, the user information includes mail addresses of users in a manner of being associated with the user names.

The management server 10 is a computer that, in response to receiving a print request mail, carries out a process of generating "print data" from electronic data included in the print request mail, and so forth. Print data has such a data format that the image forming apparatuses 20 can interpret the print data. The management server 10 associates the generated print data with the user name of the user of the transmission source (sender) of the print request mail or an "identifier" generated for each print request mail, and transmits it to the storage server 60. When the transmission source address of the print request mail is associated with the user name and is managed by the authentication server 50, the user name is to be associated with the print data. When the condition where the transmission source address of the print request mail is associated with the user name and is managed by the authentication server 50 is not satisfied, the print data is to be associated with an "identifier" generated for each print request mail. Hereinafter, such an "identifier" will be referred to as a "Personal Identification Number (PIN) code". Note that even when the transmission source address of the print request mail is associated with the user name and is managed by the authentication server 50, the print data is to be associated with a PIN code when the PIN code is designated in the print request mail.

The storage server 60 is a computer that stores print data transmitted from the management server 10.

Each image forming apparatus 20 is an apparatus that carries out printing of print data from among print data stored in the storage server 60 associated with a user name or a PIN code that is input by a user in the image forming apparatus 20.

Figure 2:
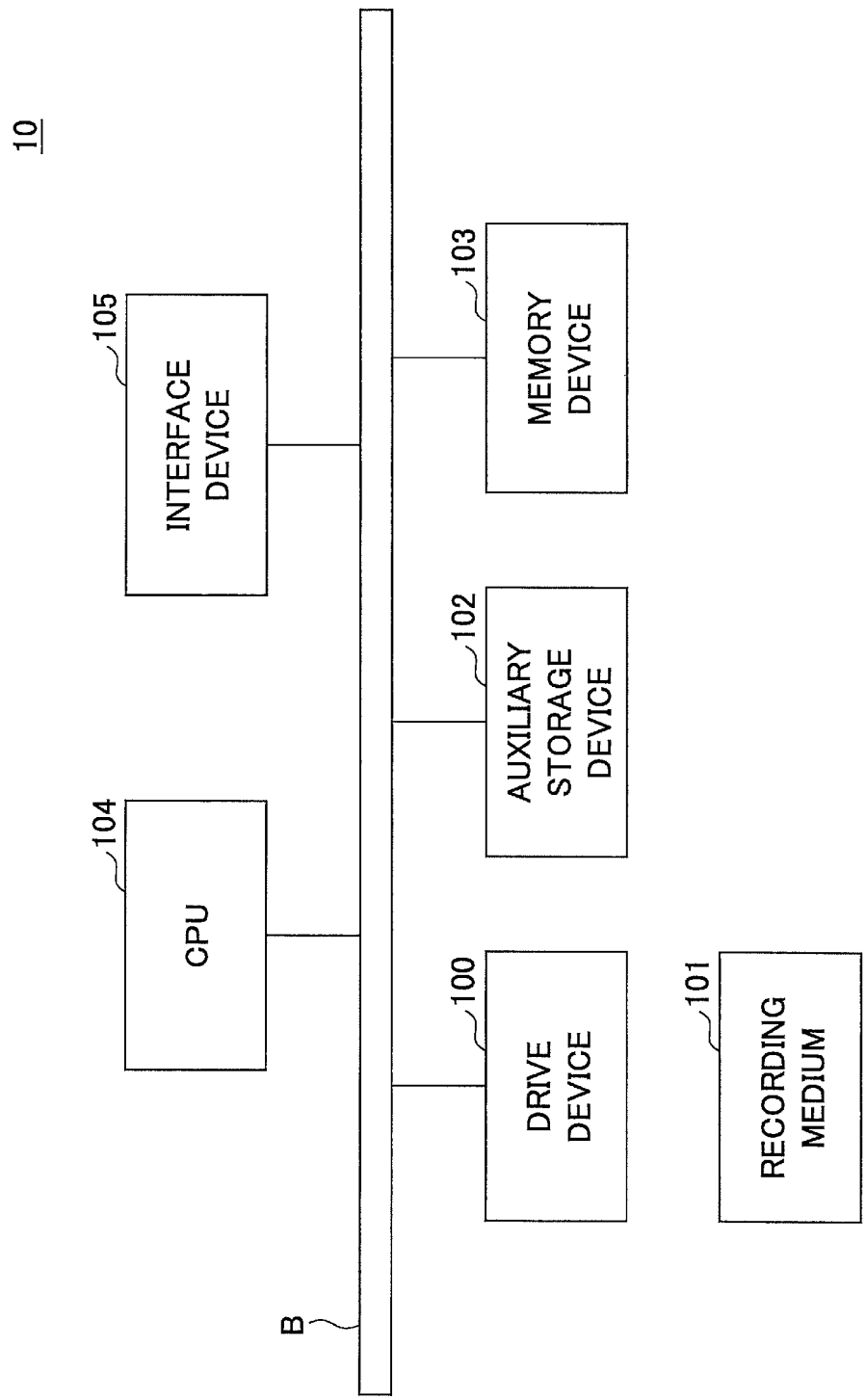
FIG. 2 shows a hardware configuration example of a management server according to the first embodiment.

FIG. 2 shows a hardware configuration example of the management server according to the first embodiment. The management server 10 in FIG. 2 includes a drive device 100, an auxiliary storage device 102, a memory device 103, a CPU 104, an interface device 105 and so forth mutually connected by a bus B.

A program that implements processes in the management server 10 is provided by a recording medium 101 such as a CD-ROM. When the recording medium 101 storing the program is set in the drive device 100, the program is installed from the recording medium 101 in the auxiliary storage device 102 through the drive device 100. However, the program needs not be installed from the recording medium 101 and can be downloaded from another computer via a network. The auxiliary storage device 102 stores the installed program and also necessary files and data.

When an instruction to start the program is given, the memory device 103 reads the program from the auxiliary storage device 102 and stores it. The CPU 104 carries out functions concerning the management server 10 according to the program stored in the memory device 103. The interface device 105 is used as an interface for connecting with a network.

Figure 3:
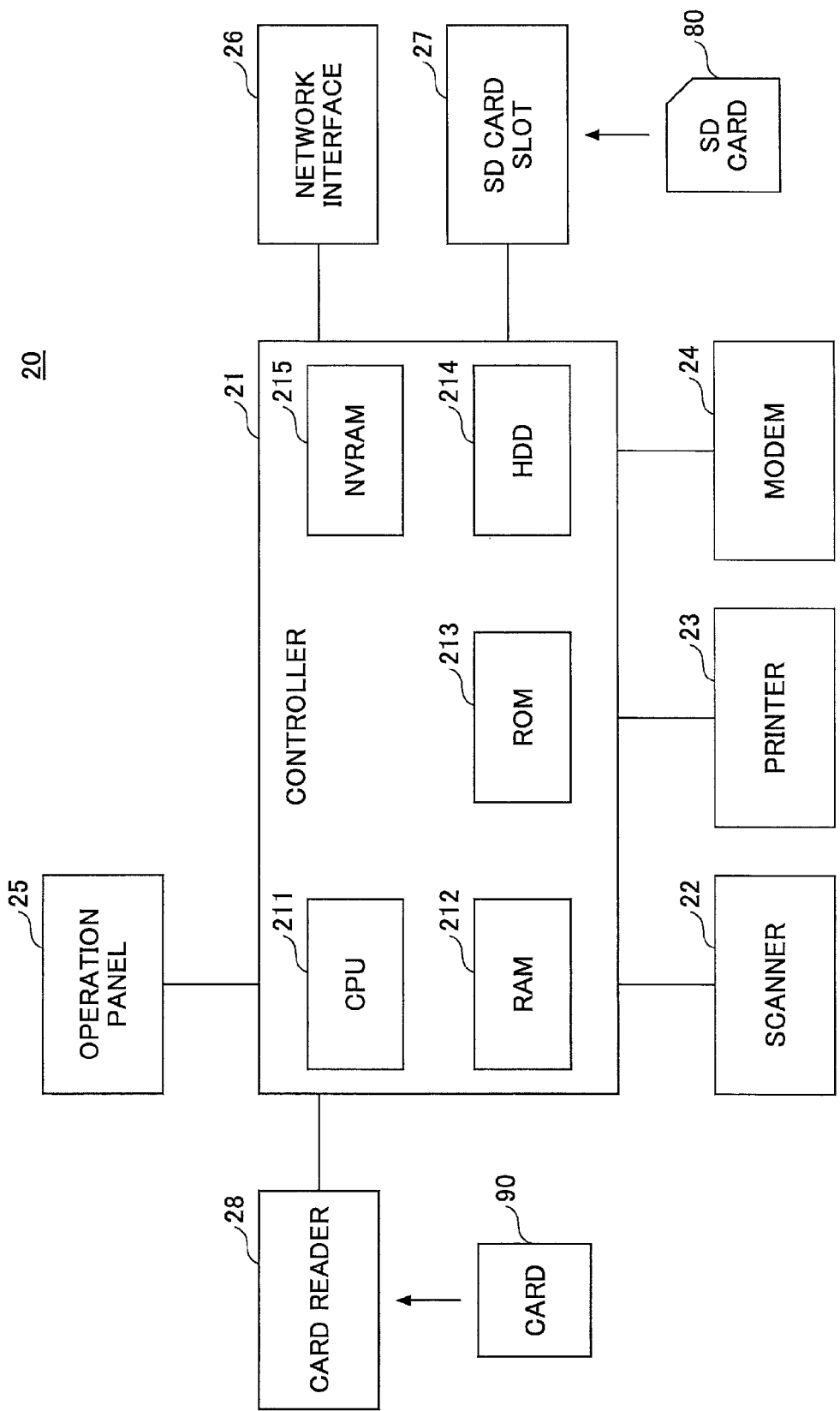
FIG. 3 shows a hardware configuration example of an image forming apparatus according to the first embodiment.

FIG. 3 shows a hardware configuration example of the image forming apparatus according to the first embodiment. In FIG. 3, the image forming apparatus 20 has hardware such as a controller 21, a scanner 22, a printer 23, a modem 24, an operation panel 25, a network interface 26, a SD slot card slot 27, a card reader 28 and so forth.

The controller 21 includes a CPU 211, a RAM 212, a ROM 213, a HDD 214, a NVRAM 215 and so forth. The ROM 213 stores various programs, data used by a program and so forth. The RAM 212 is used as a storage area for loading a program, a work area for a loaded program and so forth. The CPU 211 executes a program loaded in the RAM 212 and implements various functions. The HDD 214 stores programs, various data used by programs and so forth. The NVRAM 215 stores various setting information.

The scanner 22 is hardware (image reading part) for reading image data from an original. The printer 23 is hardware (printing part) for printing print data on a sheet of paper. The modem 24 is hardware for connecting with a telephone line and is used for transmitting/receiving image data through facsimile communication. The operation panel 25 is hardware such as an input part such as buttons or the like for receiving an input from a user, a display part such as a liquid crystal panel and so forth. The liquid crystal panel can have a touch panel function. In this case, the liquid crystal panel also includes a function of the input part. The network interface 26 is hardware for connecting with a network such as a LAN or the like (that can be wired or wireless). The SD card slot 27 is used for reading a program stored in a SD card 80. That is, in the image forming apparatus 20, not only a program stored in the ROM 213 but also a program stored in the SD card 80 can be loaded in the RAM 212 and can be executed. Note that it is also possible to use another recording medium (for example, a CD-ROM, a Universal Serial Bus (USB) memory or the like) instead of the SD card 80. That is, a type of such a recording medium to be used instead of the SD card 80 is not limited to a predetermined one. In this case, the SD card slot 27 can be replaced by hardware corresponding to the type of the recording medium to be used instead. The card reader 28 is a so-called "card reader" that reads information from a card 90. The card reader 28 can be incorporated in the image forming apparatus 20 or can be connected with the image forming apparatus 20 through an external interface (for example, a USB interface) or the like that the image forming apparatus 20 includes. Further, the card reader 28 can be of a contact type or non-contact type. The card 90 is not limited to an IC card. The card 90 can be one such that at least a unique card ID (card number) is recordable in each card 90, such as a magnetic card. A card ID is commonly called a Universal ID or a Card Serial Number. A specific example of a card 90 can be a Proximity card, a Mifare card, a Java (registered trademark) card or the like.

According to the present embodiment, it is assumed that a card 90 is distributed to each authorized user from, for example, an organization (for example, the company A) to which the authorized user belongs. However, a plurality of the authorized users can share a single card 90 depending on an operationally required security level. On the other hand, the guest users do not have cards 90.

Note that according to the first embodiment, the image forming apparatus 20 needs not include the scanner 22 and the modem 24. In other words, the image forming apparatus 20 can also be a printer instead of a multifunction peripheral.

Figure 4:
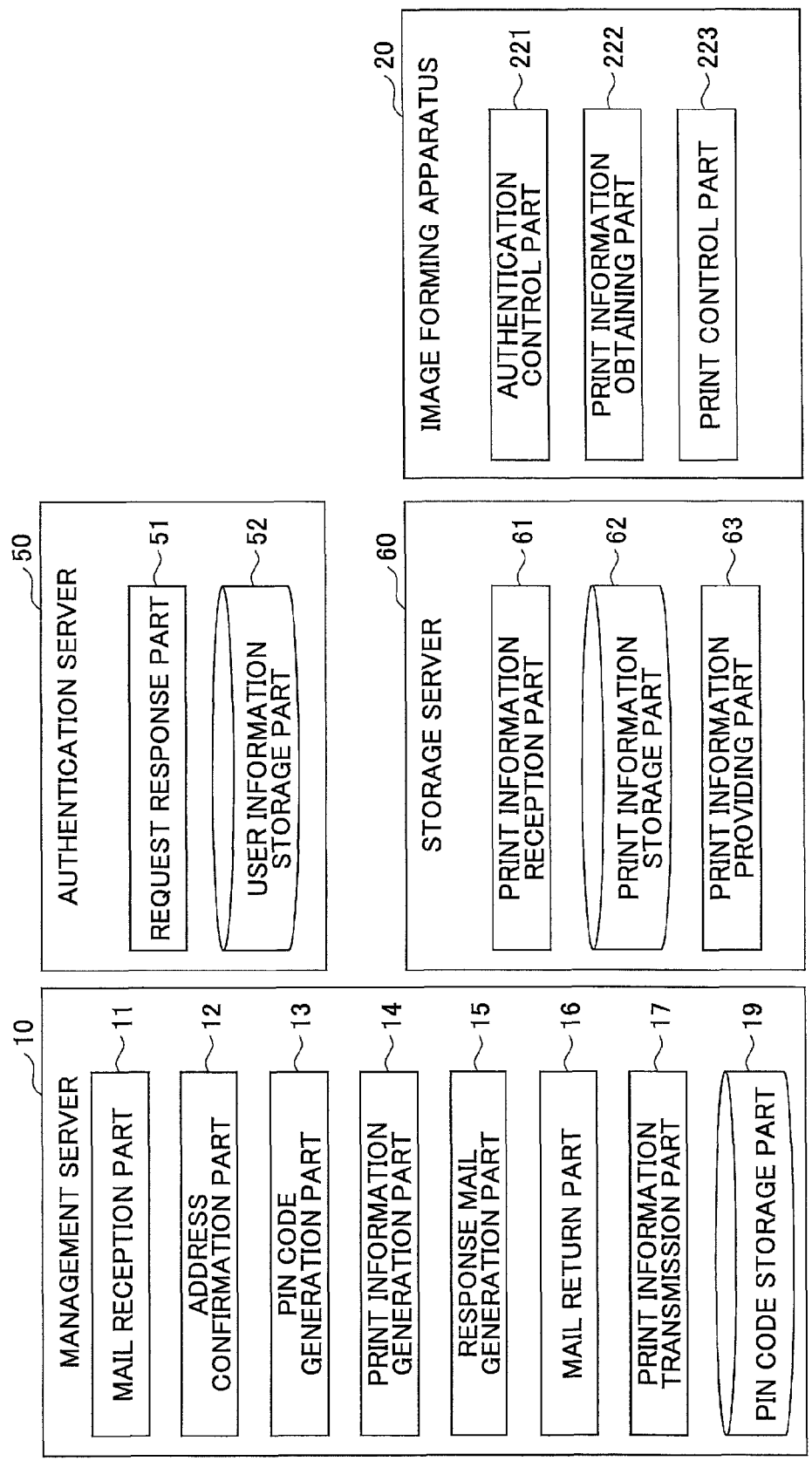
FIG. 4 shows a functional configuration example of the print system according to the first embodiment.

FIG. 4 shows a functional configuration example of the print system according to the first embodiment. In FIG. 4, the management server 10 includes a mail reception part 11, an address confirmation part 12, a PIN code generation part 13, a print information generation part 14, a response mail generation part 15, a mail return part 16, a print information transmission part 17 and so forth. These parts are implemented by processes carried out by the CPU 104 according to one or more programs installed in the management server 10.

The management server 10 uses the PIN code storage part 19. The PIN code storage part 19 can be implemented by using the auxiliary storage device 102, a storage device connected with the management server 10 via a network, or the like.

The mail reception part 11 receives a print request mail. A print request mail includes print target data that a user wishes to print (for example, a mail body, an attached file or the like). For example, a user transmits a mail including print target data from the user terminal 30 for a mail address (destination) in a specific domain. The mail reception part 11 determines that a received mail is a print request mail by receiving the mail in which the specific domain is set as its destination.

The address confirmation part 12 transmits a presence confirmation request concerning the transmission source of a print request mail to the authentication server 50 and queries the authentication server 50 whether the transmission source address is registered in the authentication server 50. When the transmission source address is registered in the authentication server 50, the address confirmation part 12 obtains the user name corresponding to the transmission source address from the authentication server 50. When the transmission source address is not registered in the authentication server 50, the PIN code generation part 13 generates a PIN code. The print information generation part 14 generates "print information" corresponding to a print request mail. "Print information" includes print data, information concerning a print job of the print data, also a user name or a PIN code, and so forth.

The response mail generation part 15 generates an electronic mail (hereinafter, referred to as a "response mail") as a response to a print request mail. A response mail includes identification information of a print job based on each print data. The response mail also includes a PIN code when the PIN code is generated concerning the print request mail.

The mail return part 16 returns a response mail to the transmission source address of a print request mail. The print information transmission part 17 transmits print information to the storage server 60 and stores the print information in the storage server 60.

The PIN code storage part 19 associates a PIN code generated by the PIN code generation part 13 or a PIN code designated in a print request mail with the transmission source address of the print request mail and stores the PIN code.

The authentication server 50 includes a request response part 51, a user information storage part 52 and so forth. The user information storage part 52 stores user information for each authorized user. The request response part 51 carries out processes in response to an authentication request, a presence confirmation request for a mail address, a request to obtain a user name corresponding to a mail address, and so forth. Note that the request response part 51 is implemented by a process carried out by a CPU of the authentication server 50 according to a program installed in the authentication server 50. The user information storage part 52 can be implemented by using an auxiliary storage device of the authentication server 50 or a storage device connected with the authentication server 50 via a network.

The storage server 60 includes a print information reception part 61, a print information storage part 62, a print information providing part 63 and so forth. The print information reception part 61 receives print information transmitted from the management server 10 and stores it in the print information storage part 62. In response to a request to obtain print information sent from the image forming apparatus 20, the print information providing part 63 returns, to the image forming apparatus 20, print information including a user name or a PIN code designated in the request to obtain print information from among print information stored in the print information storage part 62.

Note that the print information reception part 61 and the print information providing part 63 are implemented by processes carried out by a CPU of the storage server 60 according to one or more program installed in the storage server 60. The print information storage part 62 can be implemented using an auxiliary storage device of the storage server 60, a storage device connected with the storage server 60 via a network or the like.

The image forming apparatus 20 includes an authentication control part 221, a print information obtaining part 222, a print control part 223 and so forth. These parts are implemented by processes carried out by the CPU 211 according to one or more programs installed in the image forming apparatus 20. The authentication control part 221 receives, from a user, "a user name and a password" or "a PIN code". When a user name and a password are input, the authentication control part 221 requests the authentication server 50 to carry out authentication using the user name and the password. The print information obtaining part 222 transmits a request to obtain print information to the storage server 60. At least one of a user name and a PIN code received by the authentication control part 221 is designated in the request to obtain print information. The print control part 223 carries out a print process concerning print data obtained by the print information obtaining part 222.

Figure 5:
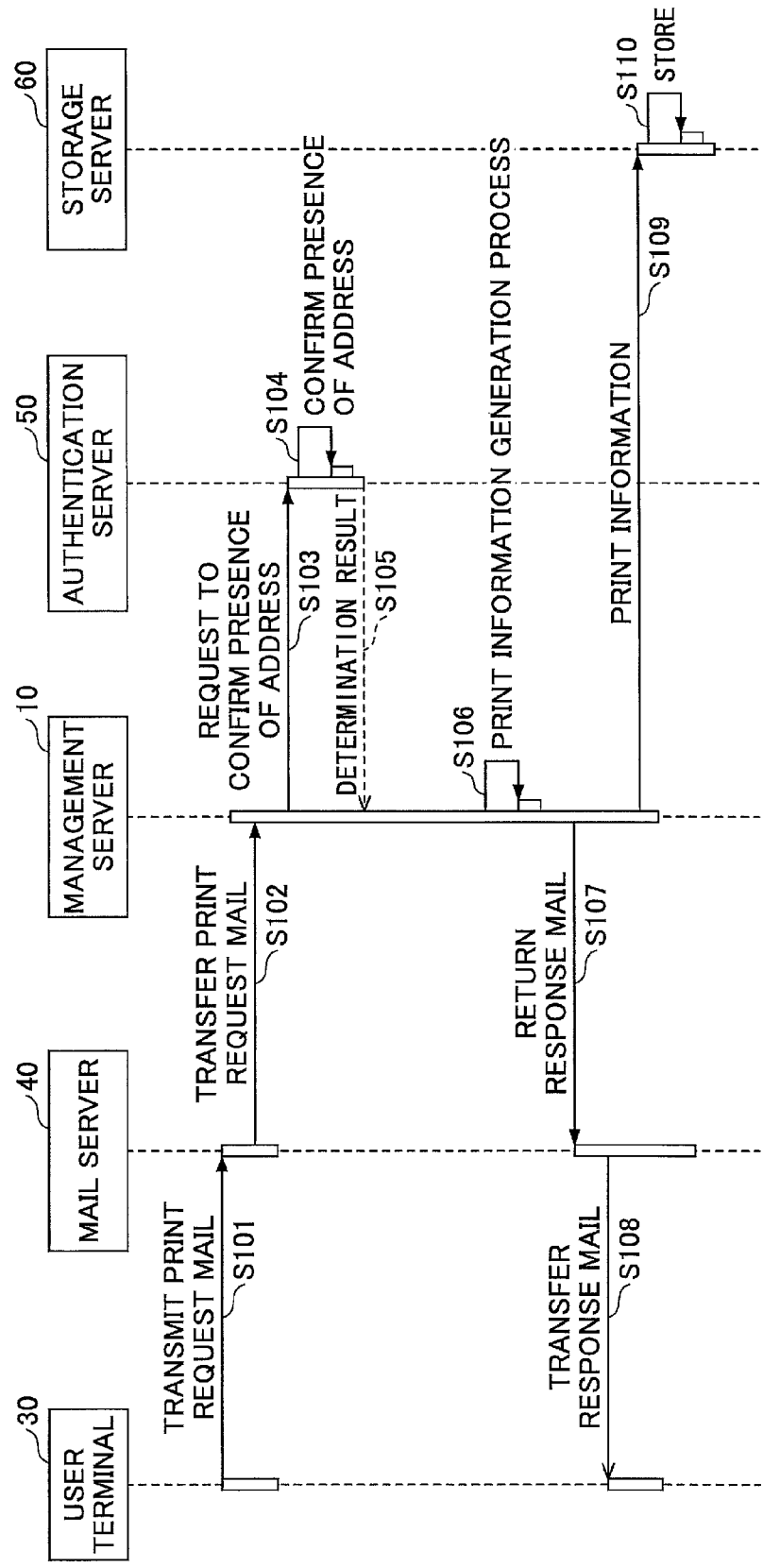
FIG. 5 is a sequence diagram illustrating one example of a procedure of storing print data according to the first embodiment.

Below, procedures carried out in the print system 1 will be described. FIG. 5 is a sequence diagram illustrating one example of a procedure of storing print data according to the first embodiment.

In step S101, in response to an instruction that is input by a user, the user terminal 30 transmits a print request mail for a "predetermined mail address". Electronic data to be printed is attached to the print request mail. It is possible to designate a PIN code in the print request mail according to a predetermined description format. The PIN code can be one issued for the user or one not yet issued (freely designated by the user). One example of the predetermined description format is such that in the title or the body of a print request mail, a PIN code "xxx" is designated in a form of "PIN=xxx". Note that the predetermined mail address is, for example, a mail address previously determined as a mail address for the management server 10.

The mail server 40 transfers the print request mail for the management server 10 according to a common communication protocol for transferring electronic mails (S102).

The print request mail is received by the mail reception part 11 in the management server 10. In response to the reception of the print request mail, the management server 10 designates the transmission source address of the print request mail and transmits a presence confirmation request for the address to the authentication server 50 (S103). In response to a reception of the presence confirmation request, the request response part 51 in the authentication server 50 determines whether the mail address designated in the presence confirmation request is stored in the user information storage part 52 (S104).

FIG. 6 shows a configuration example of the user information storage part. In FIG. 6, the user information storage part 52 stores user information for each authorized user. The user information includes, for example, user names, passwords, card IDs, mail addresses and so forth. It is also possible to register, for each single user, a plurality of mail addresses such as those for a PC, a portable terminal and so forth. A card ID is a card ID of a card 90 distributed to each authorized user.

In step S104, the request response part 51 determines whether the same mail address as the mail address designated in the presence confirmation request is included as the mail address of any user information stored in the user information storage part 52.

Next, the request response part 51 returns a response including the determination result to the management server 10 (S105). The determination result is information indicating whether the same mail address is present.

In response to reception of the determination result, the management server 10 carries out a process of generating print information (print information generation process) concerning the print request mail (S106). Next, the mail return part 16 in the management server 10 returns a response mail for the print request mail to the transmission source address of the print request mail (S107). The response mail is transferred to the user terminal 30 which is the transmission source of the print request mail by the mail server 40 (S108). Note that the response mail is generated in the print information generation process.

On the other hand, after returning the response mail, the print information transmission part 17 in the management server 10 transmits the print information including the print data generated in the print information generation process, information associated with the print data, and so forth, to the storage server 60 (S109).

When receiving the print information, the print information reception part 61 in the storage server 60 stores the print information in the print information storage part 62 (S110).

FIG. 7 shows a configuration example of the print information storage part according to the first embodiment. In FIG. 7, the print information storage part 62 stores print information for each print data. Print information includes a job name, a user mode, print data, a user name or a PIN code, and so forth.

A job name is identification information for each print data or for each print job which is executed for each print data. A user mode is information indicating whether the transmission source address of a print request mail is managed in the user information storage part 52. According to the present embodiment, a user mode indicates whether a user who requests printing is an authorized user or a guest user. "U" represents an authorized user and "G" represents a guest user. A user name is the user name of the user when the user of the print request mail is an authorized user. A PIN code is a PIN code assigned to print data.

Figure 8:
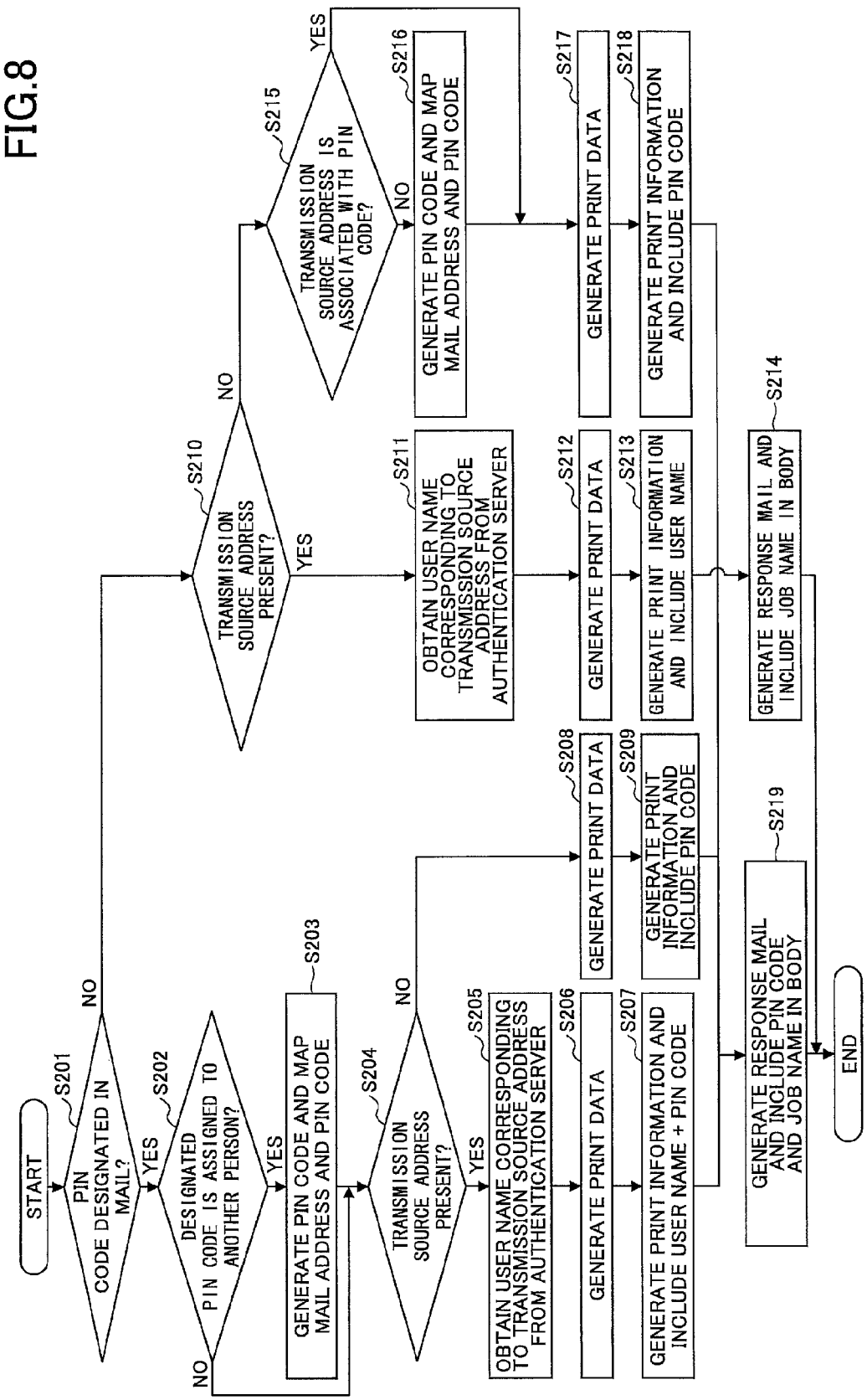
FIG. 8 is a flowchart illustrating one example of a procedure of a print information generation process according to the first embodiment.

Next, details of step S106 will be described. FIG. 8 is a flowchart illustrating one example of a procedure of a print information generation process according to the first embodiment.

In step S201, the PIN code generation part 13 determines whether a PIN code is designated in the print request mail.

For example, it is determined whether the title of the body of the print request mail includes a description having a form of "PIN=xxx".

When a PIN code is designated in the print request mail (YES in S201), the PIN code generation part 13 determines whether the same PIN code (hereinafter, referred to as a "designated PIN code") is assigned to a user other than the sender of the print request mail by reading the PIN code storage part 19 (S202).

FIG. 9 shows a configuration example of the PIN code storage part. As shown in FIG. 9, in the PIN code storage part 19, PIN codes previously issued are associated with the transmission source addresses of print request mails that are the issuance sources of the PIN codes and are stored.

In step S202, it is determined whether the same value as the designated PIN code is associated with a mail address different from the transmission source address of the currently received print request mail and is stored in the PIN code storage part 19.

When the designated PIN code is assigned to another user (YES in S202), the PIN code generation part 13 generates a PIN code not duplicate with the PIN codes stored in the PIN code storage part 19, and associates the generated PIN code with the transmission source address of the print request mail and stores it in the PIN code storage part 19 (S203). A PIN code can be generated by any method as long as the PIN code has a different value for each print request mail. However, it is preferable that a PIN code is made of letters, a number or the like that can be easily input through the operation panel 25 or through a software keyboard displayed the operation panel 25 of the image forming apparatus 20. Note that when the designated PIN code is not assigned to another user (NO in S202), the PIN code generation part 13 does not generate a PIN code.

Next, the address confirmation part 12 determines whether the determination result received in step S105 of FIG. 5 indicates a presence of the same address as the transmission source address of the print request mail (S204). When the determination result received in step S105 of FIG. 5 indicates a presence of the same address as the transmission source address of the print request mail (YES in S204), the address confirmation part 12 obtains the user name corresponding to the transmission source address from the authentication server 50 (S205). That is, the user name associated with the transition source address in the user information storage part 52 is obtained.

Next, the print information generation part 14 generates print data for each of the electronic data (print target data) in the body of the print request mail and electronic data attached to the print request mail (S206). However, it is also possible that only the attached electronic data is used to generate print data. Further, when the electronic data has a library file format such as a zip format including a plurality of files, the print information generation part 14 decompresses the electronic data, and generates print data for each file obtained from the decompression. Therefore, a plurality of sets of print data (print jobs) can be generated from a single print request mail.

Next, the print information generation part 14 generates print information for each set of print data (S207). That is, for each set of print data, a job name is generated, and each set of print data is included in the corresponding set of print information. "U" is set as a user mode in each set of print information. Further, a PIN code is set in each set of print information when the PIN code is generated in step S203, and the designated PIN code is set in each set of print information when step S203 is not executed. When a plurality of sets of print information are generated, a common PIN code can be set for the respective sets of print information. Further, in each set of print information, the user name obtained in step S205 is set. The generated print information is transmitted to the storage server 60 in step S109.

Next, the response mail generation part 15 generates a response mail in which the job name of each set of print information and the PIN code that is set in each set of print information are written in, for example, its body (S219). The response mail is transferred to the user terminal 30 that is the transmission source of the print request mail in step S107 and S108 of FIG. 5. By reading the response mail, the user can know the job name and the PIN code corresponding to each set of print data generated for the print request mail.

On the other hand, when the determination result received in step S204 indicates an absence of the same address as the transmission source address of the print request mail (NO in S204), the print information generation part 14 generates print data for each of the electronic data (print target data) in the body of the print request mail and electronic data attached to the print request mail (S208). The process contents in step S208 can be the same as step S206.

Next, the print information generation part 14 generates print information for each set of print data (S207). That is, for each set of print data, a job name is generated, and each set of print data is included in the corresponding set of print information. "G" is set as a user mode in each set of print information. Further, when a PIN code is generated in step S203, the PIN code is set in each set of print information. When step S203 is not executed, the designated PIN code is set in each set of print information. The generated print information is transmitted to the storage server 60 in step S109 of FIG. 5. Next, step S219 is executed.

In step S201, when no PIN code is included in the print request mail (NO in S201), the address confirmation part 12 determines whether the determination result received in step S105 in FIG. 5 indicates a presence of the same transmission source address of the print request mail (S210). When the determination result does not indicate a presence of the same transmission source address (YES in S210), the same process as steps S205 and S206 are executed in steps S211 and S212. Next, the print information generation part 14 generates print information for each set of print data (S213). That is, for each set of print data, a job name is generated, and each set of print data is included in the corresponding set of print information. "U" is set as a user mode in each set of print information. Further, in each set of print information, the user name obtained in step S211 is set. The thus generated print information is transmitted to the storage server 60 in step S109 of FIG. 5.

Next, the response mail generation part 15 generates a response mail in which the job name of each set of print information is written in, for example, its body (S214). The response mail is transferred to the user terminal 30 that is the transmission source of the print request mail in step S107 and S108 of FIG. 5. By reading the response mail, the user can know the job name corresponding to each set of print data generated for the print request mail.

On the other hand, when the determination result in step S210 indicates an absence of the same transmission source address (NO in S210), the PIN code generation part 13 determines whether the same transmission source address of the print request mail is associated with a PIN code in the PIN code storage part 19 (S215). When the same transmission source address is not associated with a PIN code (NO in S215), the PIN code generation part 13 carries out the same process as step S203 (S216). That is, a new PIN code is generated.

In case of YES in step S215, or subsequent to step S216, the same process as steps S208 and S209 are carried out (S217, S218). Then, step S219 is executed.

According to the process of FIG. 8, a response mail including a PIN code is returned to a guest user at any time. On the other hand, for an authorized user, a response mail is returned in which, when a PIN code is designated in the print request mail, the PIN code or a PIN code generated in such a manner as to avoid duplication with a PIN code of another user. In other words, in a case of an authorized user, when a PIN code is not designated in a print request mail, no PIN code is issued for the authorized user.

Note that it is also possible that, in a print request mail, no PIN code is designated but issuance of a PIN is required. It is also possible that a request to issue a PIN code is indicated in such a manner that, for example, a predetermined keyword, such as "PIN" is designated in the title, the body or the like of a print request mail. In this case, such a configuration can be provided that step S202 is not executed but step S203 is executed.

Thereafter, the user who receives the response mail goes to a place at which the image forming apparatus 20 is installed and operates the image forming apparatus 20. Next, a procedure carried out by the image forming apparatus 20 according to the operation of the user will be described.

Figure 10:
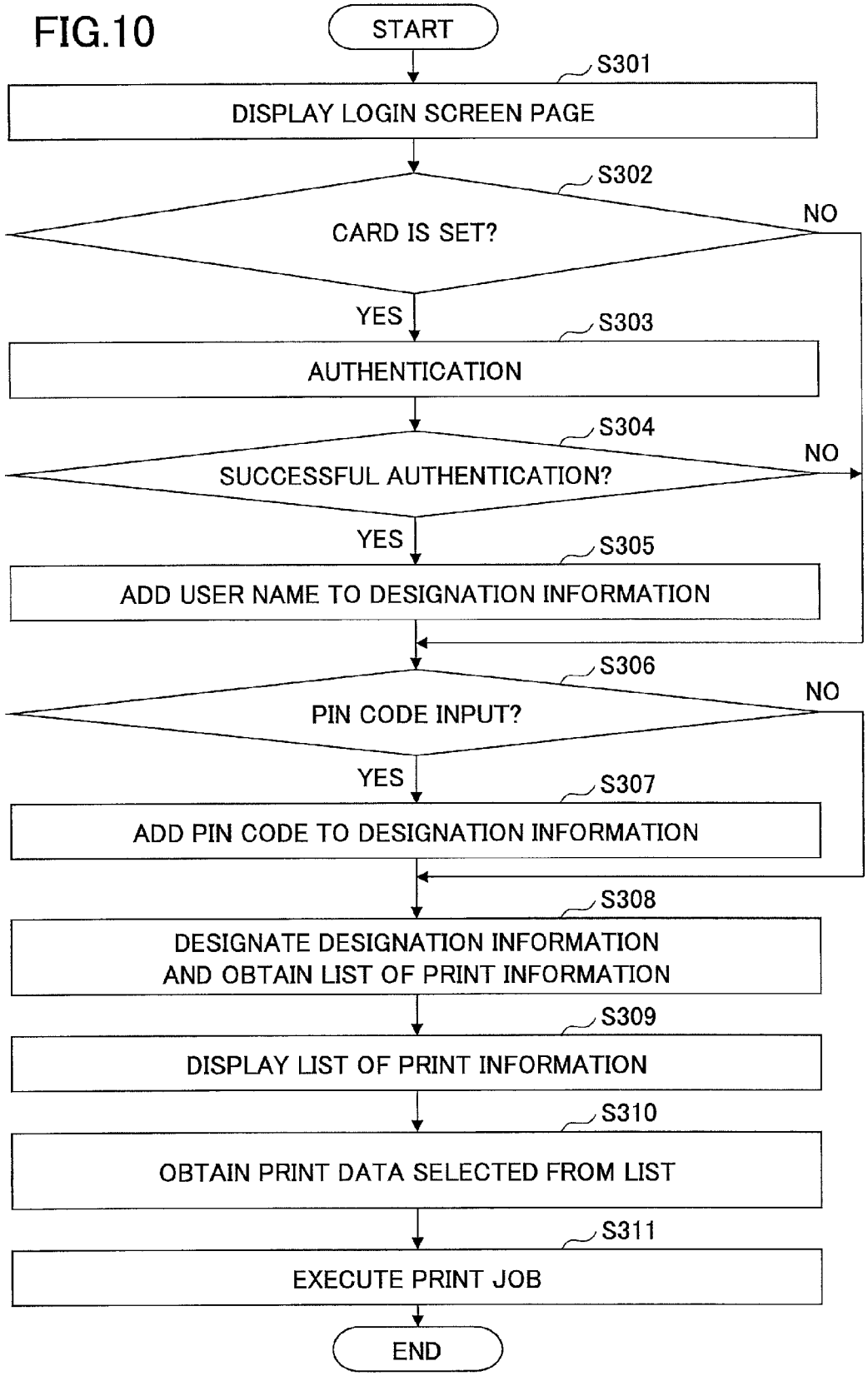
FIG. 10 is a flowchart illustrating one example of a procedure carried out by the image forming apparatus according to the first embodiment.

FIG. 10 is a flowchart illustrating one example of a procedure carried out by the image forming apparatus 20 according to the first embodiment.

For example, in response to a function of printing print data stored in the storage server 60 being invoked, the authentication control part 221 displays a login screen page on the operation panel (S301).

Figure 11:
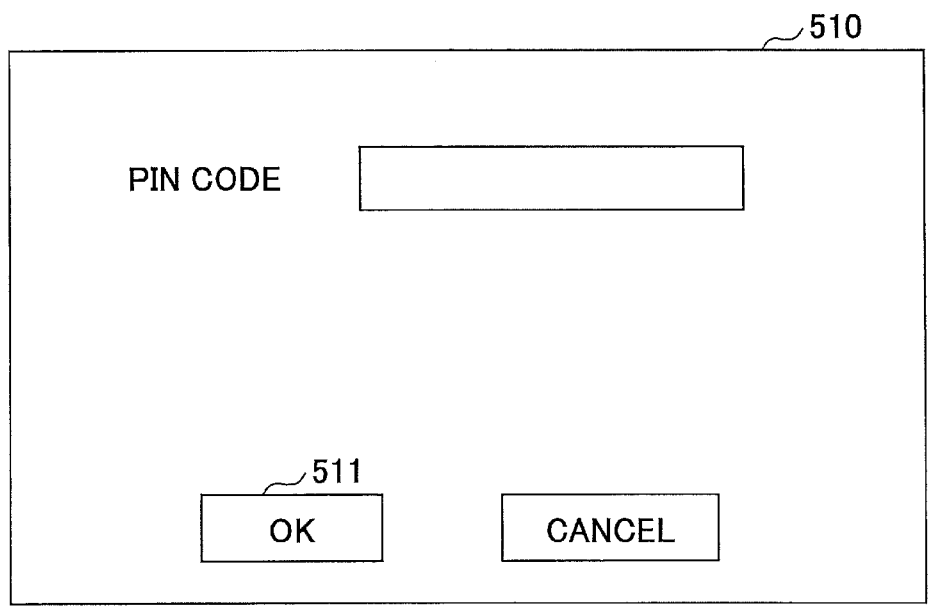
FIG. 11 shows a display example of a login screen page.

FIG. 11 shows a display example of a login screen page. In FIG. 11, a login screen page 510 has input areas for a PIN code and so forth.

For example, when an operator of the image forming apparatus 20 is an authorized user and does not have a PIN code issued, a card 90 is set in the card reader 28 in the image forming apparatus 20. "A card 90 is set" means that such a state is obtained that the card reader 28 can read information recorded in the card 90 as a result of, for example, the card 90 being inserted into the card reader 28 or the card 90 being held up to the card reader 28.

On the other hand, when an operator of the image forming apparatus 20 is a guest user, or when an authorized user has a PIN code issued, the PIN code notified by the response mail is input to the login screen page 510.

However, it is also possible that when the operator is an authorized user, the PIN code is input to the login screen page 510 and also the card 90 is set to the card reader 28. For example, when an authorized user transmits a print request mail from a mail address of a user terminal for private use, i.e., not stored in the user information storage part 52, a PIN code is included in a response mail returned to the user terminal 30. Further, there can be a case where the same authorized user also transmits a print request mail from a mail address (hereinafter, referred to as an "authorized address") stored in the user information storage part 52 separately. In this case, concerning the authorized user, both a set of print data not associated with the user name but associated with the PIN code and a set of print data associated with the user name are stored in the storage server 60 in a mixed manner. In order to make it possible to carry out printing both the sets of print data by a one-time login operation, both inputting the PIN code and setting the card 90 can be performed simultaneously.

When the card 90 is set to the card reader 28, when a PIN code is input to the login screen page 510 and an "OK" button 511 is pressed, or when a PIN code is input to the login screen page 510 and the card 90 is set to the card reader 28, the authentication control part 221 branches the process according to whether the card 90 is set (S302). When the card 90 is set (YES in S302), the authentication control part 221 carries out authentication (S303). Specifically, the authentication control part 221 transmits an authentication request in which the card ID that is read from the card 90 that is set is designated to the authentication server 50. The request response part 51 in the authentication server 50 determines whether the same card ID is associated with a user name and is stored in the user information storage part 52. When the same card ID is stored in the user information storage part 52, the authentication is successful. When the same card ID is not stored in the user information storage part 52, the authentication fails. The request response part 51 returns information indicating successful authentication or authentication failure to the authentication control part 221 of the image forming apparatus 20 that transmitted the authentication request. In case of successful authentication, also the user name associated with the card ID is returned.

When the authentication is successful (YES in S304), the print information obtaining part 222 adds the returned user name to "designation information" (S305). "Designation information" means information to be designated when a list of print information is to be obtained from the storage server 60 in step S308 described later. Step S305 is not executed when the authentication has failed (NO in S304).

When no card 90 is set (NO in S302), when the authentication has failed based on the card 90 (NO in S304) or when step S305 is executed, the print information obtaining part 222 determines whether a PIN code is input to the login screen page 510 (S306). When a PIN code is input (YES in S306), the print information obtaining part 222 adds the PIN code to the designation information (S307). When no PIN code is input (NO in S306), step S307 is not executed.

Next, the print information obtaining part 222 designates the designation information to obtain a list of print information from the storage server 60 (S308). In more detail, the print information obtaining part 222 designates the designation information and transmits a request to obtain a list of print information to the storage server 60. In response to the request to obtain a list of print information, the print information providing part 63 in the storage server 60 obtains the print information including the designation information designated in the request to obtain a list of print information from the print information storage part 62 (FIG. 7). That is, when the card 90 is set and the authentication is successful, the print information having the user mode "U" and including the user name associated with the card ID is obtained. When no card 90 is set and a PIN code is input to the login screen page 510, the print information including the PIN code is obtained. When the print information including the PIN code includes a user name, the print information including the user name is also obtained.

When a PIN code is input to the login screen page 510, the card 90 is set and the authentication is successful, the print information having the user mode "U" and including the user name and the print information including the PIN code are obtained. When a PIN code is input to the login screen page 510, the card 90 is set and the authentication has failed, the print information including the PIN code is obtained.

The print information providing part 63 returns a list of the obtained print information to the image forming apparatus 20. Note that it is possible to omit the print data from each set of print information thus returned.

Next, the print information obtaining part 222 in the image forming apparatus 20 causes the operation panel 25 to display a list of the job names and/or the like included in the respective sets of print information returned (S309). The list indicates candidates for a print target(s). That is, the user can input an instruction to carry out printing concerning the print information included in the list.

When one or more job names are selected from the list, the print information obtaining part 222 obtains the print data corresponding to the job names from the storage server 60 (S310). In more detail, the print information obtaining part 222 transmits a request designating the job names to obtain the print data to the storage server 60. In response to the request from the print information obtaining part 222, the print information providing part 63 in the storage server 60 returns the print data corresponding to the job names designated in the request to the image forming apparatus 20.

Note that such a configuration can be provided that when only print information for one set of print data is obtained from a user name or a PIN code that is input, step S309 is not executed but the print information obtaining part 222 obtains the print data. Such a configuration can also be provided that, instead of the print information providing part 63 returning a list of print information to the image forming apparatus 20, the print information providing part 63 transmits the print data obtained from the user name or the PIN code.

Next, the print control part 223 controls execution of the print jobs concerning the print data (S311). As a result, sheets of paper on which the print data is printed are output.

As described above, according to the first embodiment, even a guest user for whom an account such as a user name, a password and/or the like are not registered in the authentication server 50 is given print authorization. Therefore, it is possible to reduce the necessity of requesting an authorized user to carry out printing. Further, a notification of a PIN code is sent to a guest user for each print request mail. Therefore, it is possible to give a pseudo and temporary account for each guest user. Therefore, print data that each guest user can manipulate is limited to print data corresponding to a print request mail from the guest user. As a result, it is possible to avoid an occurrence of such a situation that print data of another user can be easily manipulated among guest users.

Further, it is also possible to reduce the necessity of installing an image forming apparatus 20 dedicated for guest users.

Further, in the present embodiment, designation of a PIN code or designation of a request to issue a PIN code is made possible. Such an interface is convenience, in particular, for an authorized user who has forgotten the card 90 at home.

That is, if it is not possible to designate a PIN code or a request to issue a PIN code in a print request mail, no PIN code is generated in response to a print request mail from an authorized address. As a result, it is necessary to log into the image forming apparatus 20 using the card 90 for causing the image forming apparatus 20 to execute a print job corresponding to a print request mail that the authorized user transmits from the authorized address. Thus, when having forgotten the card 90 at home or the like, it is not possible for an authorized user to cause the image forming apparatus 20 to execute a print job corresponding to a print request mail from the authorized address. However, according to the present embodiment, an authorized user can cause the image forming apparatus 20 to execute a print job by using a PIN code as a result of designating the PIN code or a request to issue the PIN code in a print request mail from the authorized address. Further, as a result of also the user name of an authorized user obtained from the authorized address being associated with a PIN code, it is possible to obtain print data, associated with the user name of the authorized user and stored before the issuance of the PIN code, by using the PIN code, and print it. Therefore, even when an authorized user who has forgotten the card 90 wishes to print print data associated with the user name and stored previously (before issuance of a PIN code), it is not necessary to again attach the same electronic data (print target data) to a print request mail.

Note that in case of a guest user, no user name is determined. Therefore, it is difficult to determine the user who carried out printing even when log information is recorded concerning the printing in the image forming apparatus 20. Therefore, in the image forming apparatus 20, it is also possible to provide limitations on printing the print data concerning print information obtained through designation of a PIN code. For example, an upper limit can be provided on the number of printable sheets of paper, color printing can be prohibited, and/or the like. Thereby, it is possible to prevent printing a very large number of sheets of paper and/or the like while hiding behind an anonymous name.

Further, such a configuration can also be provided that, when the transmission source address of a print request mail is not an authorized address, the mail address is included and recorded in log information instead of the user name. By thus including information by which it is possible to determine an individual such as a mail address in log information, it is possible to expect a psychological suppression effect against printing a very large number of sheets of paper and/or the like while hiding behind an anonymous name.

Further, a validity date can be provided on a PIN code. A PIN code having an expired validity date can be invalidated.

Further, not a card 90 but other authentication information such as a user name, a password and/or the like can be used for authentication when an authorized user logs into the image forming apparatus 20. In this case, the login screen page 510 can be configured such that a user name, a password and/or the like can be input. Authentication can be carried out by comparing a user name, a password and/or the like that are input to the login screen page 510 and user names, passwords and or the like stored in the user information storage part 52. In print information, a user name that is input to the login screen page 510 and results in successful authentication can be included. Even in such a case, an authorized user who, for example, has not used the image forming apparatus 20 for a long time and has forgotten at least one of the user name and the password can cause the image forming apparatus 20 to execute a print job corresponding to a print request mail by designating a PIN code or a request to issue a PIN code in the print request mail from the authorized address.

Next, the second embodiment will be described. Concerning the second embodiment, points different from the first embodiment will be described. Therefore, those not particularly described can be the same as the first embodiment.

As the second embodiment, an example will be described in which the functions of the management server 10, the authentication server 50 and the storage server 60 are provided via the Internet as cloud services. Therefore, in the second embodiment, the Internet is present between "the user terminal 30 and the mail server 40" and "the management server 10", and also, between "the image forming apparatus 20" and "the authentication server 50 and the storage server 60".

Figure 12:
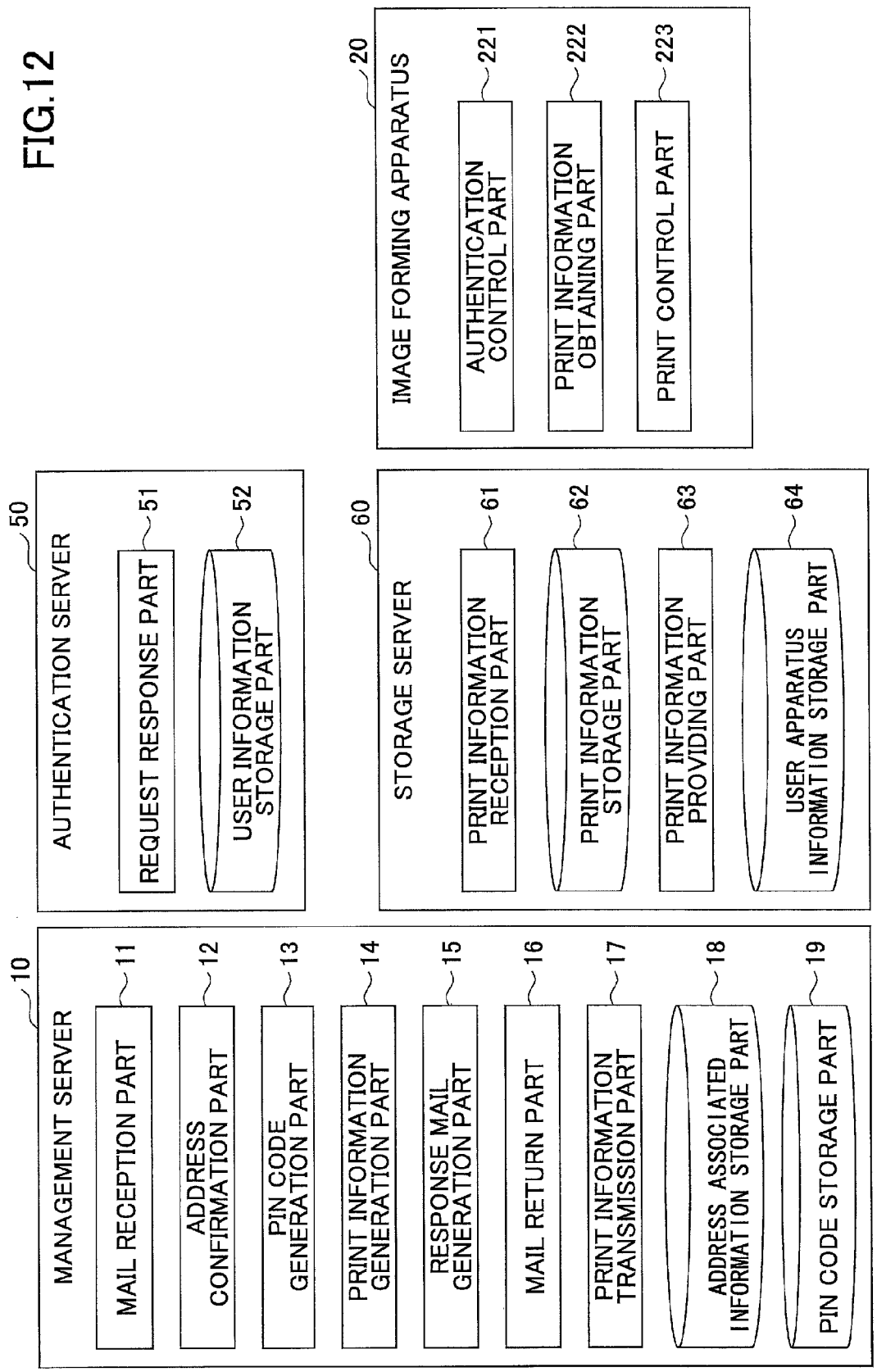
FIG. 12 shows a functional configuration example of a print system according to a second embodiment.

FIG. 12 shows a functional configuration example of a print system according to the second embodiment. In FIG. 12, the management server 10 further has an address associated information storage part 18. The address associated information storage part 18 stores mail addresses for the management server 10 assigned to respective company users. The address associated information storage part 18 can be implemented by using, for example, the auxiliary storage device 102, a storage device connected with the management server 10 via a network, or the like.

The storage server 60 further includes a user apparatus information storage part 64. The user apparatus information storage part 64 stores sets of identification information (hereinafter, referred to as "apparatus IDs") of respective image forming apparatuses 20 installed in the respective company users.

A procedure of storing print data according to the second embodiment can be the same as FIG. 5. However, the process contents are different concerning some steps. Specifically, in step S101, a user terminal 30 designates a mail address for the management server 10 assigned to a company user to which the image forming apparatus 20 to be used for printing belongs (where the image forming apparatus 20 to be used for printing is installed), and transmits a print request mail.

The mail reception part 11 in the management server 10 determines a company user whose image forming apparatus 20 is to be used for printing based on which mail address is used to receive the print request mail (which mail address is designated as the destination). The address associated information storage part 18 is used for the determination.

FIG. 13 shows a configuration example of the address associated information storage part. In FIG. 13, the address associated information storage part 18 stores, for each company user, a company code, a receiving address and so forth.

A company code is identification information assigned to each company user. A receiving address is a mail address for the management server 10 assigned to a company user. A receiving address is a mail address (or a part of a mail address) for the management server 10 to receive a print request mail from a corresponding company user.

The mail reception part 11 stores the company code corresponding to the mail address at which a print request mail is received in, for example, the memory device 103.

In a process of generating print information in step S109, the print information generation part 14 generates print information that further includes the company code stored in the memory device 103. Therefore, in step S112, the print information including the company code is transmitted to the storage server 60. When receiving the print information, the print information reception part 61 in the storage server 60 stores the print information in the print information storage part 62 (S113).

FIG. 14 shows a configuration example of the print information storage part according to the second embodiment. As shown in FIG. 14, according to the second embodiment, the print information storage part 62 further stores a company code for each print data. It is also possible to provide the print information storage part 62 for each company code.

Thereafter, the user who transmitted the print request mail goes to a place where the image forming apparatus 20 is installed and operates the image forming apparatus 20. Next, a procedure carried out by the image forming apparatus 20 according to the operation of the user will be described.

A procedure carried out by the image forming apparatus 20 according to the second embodiment can be basically the same as FIG. 10. However, the process contents are different concerning some steps. Specifically, in step S308, the print information obtaining part 222 designates designation information further including a company code and an apparatus ID, and transmits a request to obtain a list of print information to the storage server 60. An apparatus ID is the apparatus ID of the image forming apparatus 20 and is stored in, for example, the ROM 213, the NVRAM 215, the HDD 214 or the like of the image forming apparatus 20. A company code is the company code of the company at which the image forming apparatus 20 is installed and is, for example, previously set in the image forming apparatus 20. The company code that is thus set is stored in, for example, the NVRAM 215, the HDD 214 or the like.

Note that an apparatus ID can be possessed by, for example, a specific application installed in the image forming apparatus 20. In this case, it is possible to identify the image forming apparatus 20 installing the specific application by the apparatus ID. That is, according to the second embodiment, as long as it is possible to identify a specific image forming apparatus 20, an application identifier possessed by a specific application, or the like, can be used as an apparatus ID.

The print information providing part 63 in the storage server 60 determines whether the same combination of the company code and the apparatus ID as the combination included in the designation information designated in the request to obtain a list of print information is stored in the user apparatus information storage part 64.

FIG. 15 shows a configuration example of the user apparatus information storage part. As shown in FIG. 15, the user apparatus information storage part 64 associates, for each image forming apparatus 20 installed in a company user, the company code of the company user with the apparatus ID of the image forming apparatus 20, and stores them.

When the same combination of the company code and the apparatus ID as the combination included in the designation information designated in the request to obtain a list of print information is not stored in the user apparatus information storage part 64, the print information providing part 63 does not return a list of print information. This is because, in this case, the validity of the image forming apparatus 20 which transmitted the request to obtain a list of print information is suspicious. In the second embodiment, the validity of the image forming apparatus 20 means that the image forming apparatus 20 is installed in a proper company user.

When the same combination of the company code and the apparatus ID as the combination included in the designation information designated in the request to obtain a list of print information is stored in the user apparatus information storage part 64, the print information providing part 63 obtains print information including the designation information designated in the request to obtain a list of print information from the print information storage part 62 (FIG. 14). That is, according to the second embodiment, the print information further including the same company code as that included in the designation information is obtained. The print information providing part 63 returns a list of the obtained print information to the image forming apparatus 20.

Note that when it is not necessary to verify the validity of the image forming apparatus 20, it is possible to omit including a company code in designation information designated in a request to obtain a list of print information. It is possible that the print information providing part 63 determines the company code corresponding to an apparatus ID based on the apparatus ID included in designation information and the user apparatus information storage part 64, and uses the company code to obtain print information from the print information storage part 62.

According the second embodiment, as described above, the mail addresses for the management server 10 are different among the respective company users. Further, a company code is determined with respect to a request to obtain a list of print information transmitted from the image forming apparatus 20, and a list of print information including the company code is returned to the image forming apparatus 20. Therefore, it is possible to prevent such a problematic situation in which print information in response to a print request mail transmitted in a certain company becomes print candidates for another user having the same user name in another company.

Note that when the mail address of the transmission source of a print request mail is the same as the mail address of an authorized user of any company user, it is possible to determine the company code from the mail address as a result of managing correspondence information between the mail addresses of authorized users and company codes. Therefore, in consideration of usage only by authorized users, it is not necessary to provide a mail address for the management server 10 for each company user.

However, when the transmission source address of a print request mail is not an authorized address but, for example, a mail address of a guest user (hereinafter, referred to as a "user X"), there is not a company code corresponding to the mail address. Therefore, for the print request mail, it is not possible to determine a company code with respect to printing.

Thus if no company code is determined, print information not including a company code is stored in the storage server 60 and coincidence of a company code is not required when obtaining printing information in response to a request to obtain a list of print information, the user X can carry out printing from any company. In order to avoid such a situation, the second embodiment is configured such that, mail addresses for the management server 10 are different among respective company users. Also, a company code is designated in a request to obtain a list of print information, and a list of print information including the company code is returned.

Note that a mail address itself for the management server 10 assigned to each company user can be used as a company code. In this case, it is possible to omit the user apparatus information storage part 64. The mail address is included in print information which is stored in the storage server 60. The mail address is previously stored in the image forming apparatus 20. The image forming apparatus 20 transmits a request to obtain a list of print information in which the mail address is designated together with the apparatus ID to the storage server 60. The storage server 60 returns a list of print information including the mail address designated in the request to obtain a list of print information.

Even in such a configuration, it is possible to obtain the same advantageous effects.

Next, the third embodiment will be described. Concerning the third embodiment, points different from the first and second embodiments will be described. Therefore, those not particularly described can be the same as the first embodiment or the second embodiment.

Concerning the third embodiment, a variant of a process carried out at a time of user authentication in the image forming apparatus 20 will be described.

According to the third embodiment, a user uses, instead of the card 90, the user terminal 30 of a portable type including an IC chip similar to an IC card. For example, a card ID is stored in a storage part of the user terminal 30. Further, an application is installed in the user terminal 30 for reading the card ID from the storage part and transmitting it to the image forming apparatus 20 via the card reader when the user terminal 30 is held up to the card reader of the image forming apparatus 20. The authentication control part 221 in the image forming apparatus 20 carries out authentication using the card ID received through the card reader.

By the above-described configuration, an authorized user can be authenticated by holding his or her own user terminal 30 up to the image forming apparatus 20.

Further, when the user of the user terminal 30 is a guest user or when a PIN code or a request to issue a PIN code is designated in a print request mail from the user terminal 30, a response mail including a PIN code is returned in response to the print request mail transmitted by the user terminal 30, and the response mail is stored in a storage part in the user terminal 30. The above-mentioned application can be configured in such that when the user terminal 30 is held up to the card reader of the image forming apparatus 20, the application searches the user terminal 30 for the electronic mail having the transmission source address that is a predetermined mail address (that is, the above-mentioned response mail). Then, when the corresponding electronic mail is present, the application transmits the PIN code included in the electronic mail to the image forming apparatus 20 via the card reader. A configuration can also be provided such that the print information obtaining part 222 in the image forming apparatus 20 designates the PIN code received via the card reader to obtain print information.

By the above-described configuration, a user can see a list of print information associated with the PIN code assigned to the user by holding his or her own user terminal 30 up to the image forming apparatus 20.

Further, when both "a user name and a password" and "a PIN code" are stored in the user terminal 30, the image forming apparatus 20 can have such a configuration as to obtain both and obtain print information corresponding to the user name and print information corresponding to the PIN code.

Note that in the respective embodiments described above, printing by the image forming apparatus 20 has been described. However, the present invention can be applied not only to printing but also to, for example, outputting image data to a projector and so forth. That is, it is possible to apply the present invention in such a manner that print target data is replaced by output target data to be output, i.e., to be displayed by a terminal, to be projected by a projector, or the like.

Further, in the respective embodiments described above, description has been made using the example of transmitting print target data via a mail. However, a configuration can be provided such that a communication way other than a way of using a mail can be used to transmit print target data to the management server 10. In this case, the management server 10 receives, from the user terminal 30, "print target data" or "print target data and the user name". When the same user name is not stored in the user information storage part 52 or when no user name is received, the management server 10 generates a PIN code and transmits the PIN code to the user terminal 30. Further, it is also possible that print target data, the user name and a PIN code are received from the user terminal 30. In this case, when the received PIN code is not duplicate with another PIN code, the management server 10 transmits the PIN code to the user terminal 30. When the received PIN code is duplicate with another PIN code, the management server 10 generates a PIN code and transmits the PIN code to the user terminal 30. When a request to issue a PIN code is received instead of a PIN code, the management server 10 generates a PIN code and transmits the PIN code to the user terminal 30.

Further, when company codes are managed as in the second embodiment, the management server 10 receives, from the user terminal 30, print target data and the user name, or a company code in addition to print target data. When no company code is received or the same company code as the received company code is not stored in the management server 10, the management server 10 transmits a notification to the user terminal 30 indicating that printing the print target data is not permitted. When the same company code is present, but the same user name as the received user name is not stored in the user information storage part 52 or no user name is received, the management server 10 generates a PIN code and transmits the PIN code to the user terminal 30. Further, even when the same user name as the received user name is stored in the user information storage part 52, but when a PIN code or a request to issue a PIN code is received from the user terminal 30, the management server 10 transmits the received PIN code or a generated PIN code to the user terminal 30.

Note that in the respective embodiments described above, the management server 10 and the storage server 60 can be implemented by a single computer. Also, the management server 10, the storage server 60 and the authentication server 50 can be implemented by a single computer. Further, the respective functions of the management server 10, the storage server 60 and the authentication server 50 can be mounted in the image forming apparatus 20.

Inversely, each of the management server 10, the storage server 60 and the authentication server 50 can be implemented by a plurality of computers in a dispersion manner.

Further, for the respective embodiments described above, the example has been described where print data is generated in the management server 10. However, generation of print data concerning electronic data attached to a print request mail can be carried out by the user terminal 30, the management server 10, the storage server 60 or the image forming apparatus 20.

Next, the fourth embodiment will be described. Concerning the fourth embodiment, a variant of the second embodiment will be described.

Figure 16:
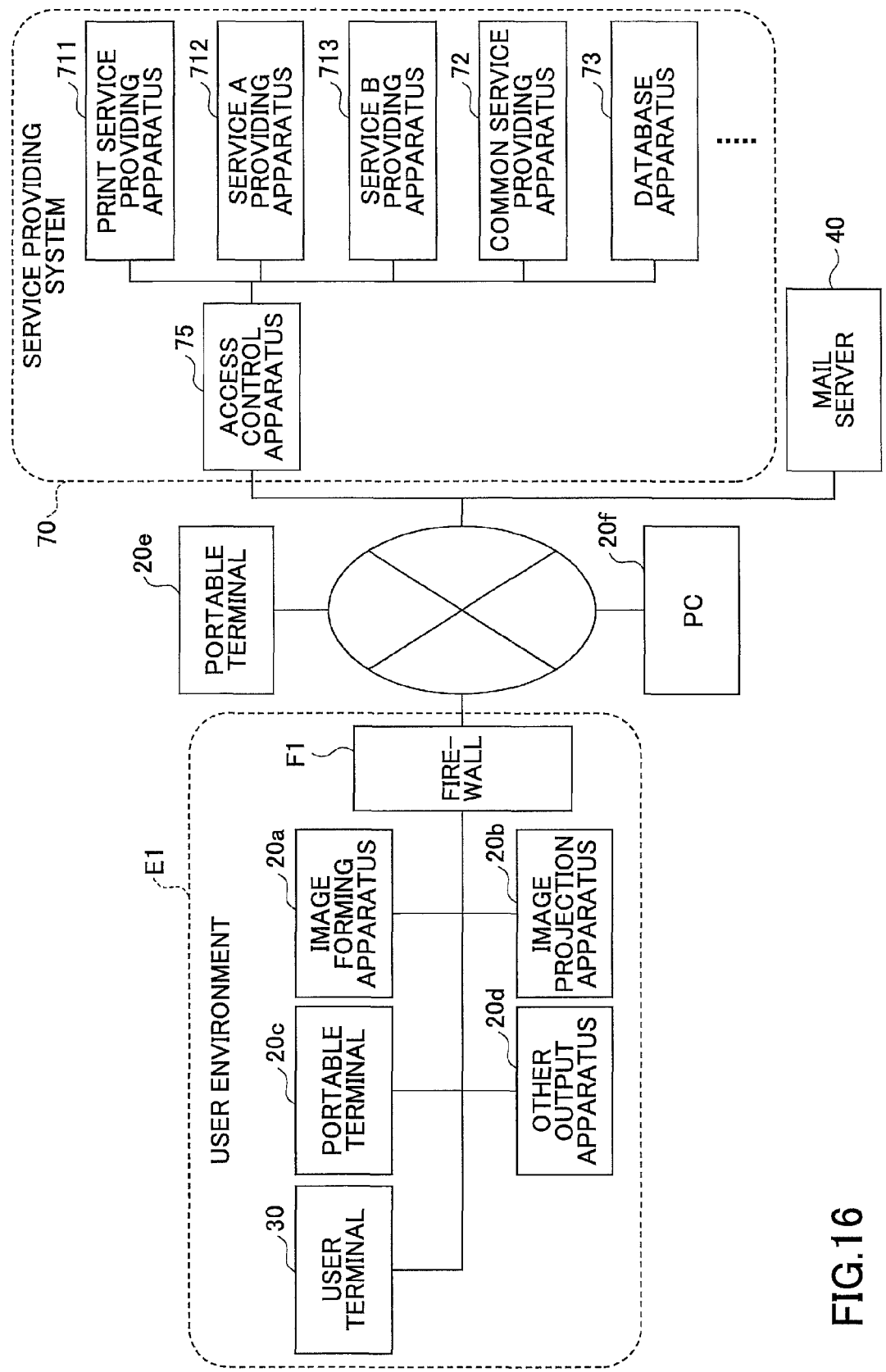
FIG. 16 shows a system configuration example of a fourth embodiment.

FIG. 16 shows a system configuration example of the fourth embodiment. In FIG. 16, the same reference numerals are given to parts having the same roles as those in FIG. 1 and description thereof is omitted. In FIG. 16, a service providing system 70 and a user environment E1 are communicatable via a wide-area communication network such as the Internet.

The service providing system 70 is a computer system providing cloud services via the network. Note that according to the fourth embodiment, cloud services are specially adopted for illustration purpose. However, the present embodiment can also be applied to various services provided via a network such as services provided by Application Service Provider (ASP), Web services, and so forth.

The service providing system 70 includes, for example, an access control apparatus 75, a print service providing apparatus 711, a service A providing apparatus 712, a service B providing apparatus 713, a common service providing apparatus 72 and a database apparatus 73. Each of these respective apparatuses can be implemented by a single computer.

The access control apparatus 75 controls access from the outside to the computers in the service providing system 70 and carries out load sharing among the respective computers.

The print service providing apparatus 711 is one or more computers controlling processes for providing cloud printing services. The cloud printing services mean services for making it possible to upload print data in a cloud environment (the service providing system 70 in the fourth embodiment) and, as is necessary, causing an image forming apparatus 20a to print the uploaded pint data.

The service A providing apparatus 712 and the service B providing apparatus 712 illustrate a group of computers, which provide services other than the cloud printing services.

The common service providing apparatus 72 is one or more computers having functions that are common to the print service providing apparatus 711, the service A providing apparatus 712, the service B providing apparatus 713 and so forth which provide specific services directly via the network, or having functions used by the plurality of apparatuses.

The database apparatus 73 is one or more computers or storage apparatuses that function as various storage parts.

The user environment E1 is a system environment in an organization such as a user company that is one example of a user. The user environment E1 shown in FIG. 16 includes the image forming apparatus 20a, an image projection apparatus 20b, a portable terminal 20c, another output apparatus 20d and a user terminal 30. These apparatuses and terminals are connected via a network (of a wired type or a wireless type) such as a Local Area Network (LAN).

The image forming apparatus 20a is the image forming apparatus 20 in the second embodiment.

The image projection apparatus 20b is, for example, a projector, and is an apparatus carrying out projection of image data. The portable terminal 20c is a Personal Digital Assistance (PDA), a tablet terminal, a smartphone, a portable phone or the like. The other output apparatus 20d is one or more of various output apparatuses.

The user environment E1 further includes a firewall F1. The firewall F1 can be the same as a common firewall. The firewall F1 blocks requests transmitted from the outside of the user environment E1, for example.

It is possible to access the service providing system 70 also from environments other than the user environment E1. For example, it possible to access the service providing system 70 from a portable terminal 20e, a PC 20f or the like via the Internet or the like. The portable terminal 20e and the PC 20f can be used also in the user environment E1.

Figure 17:
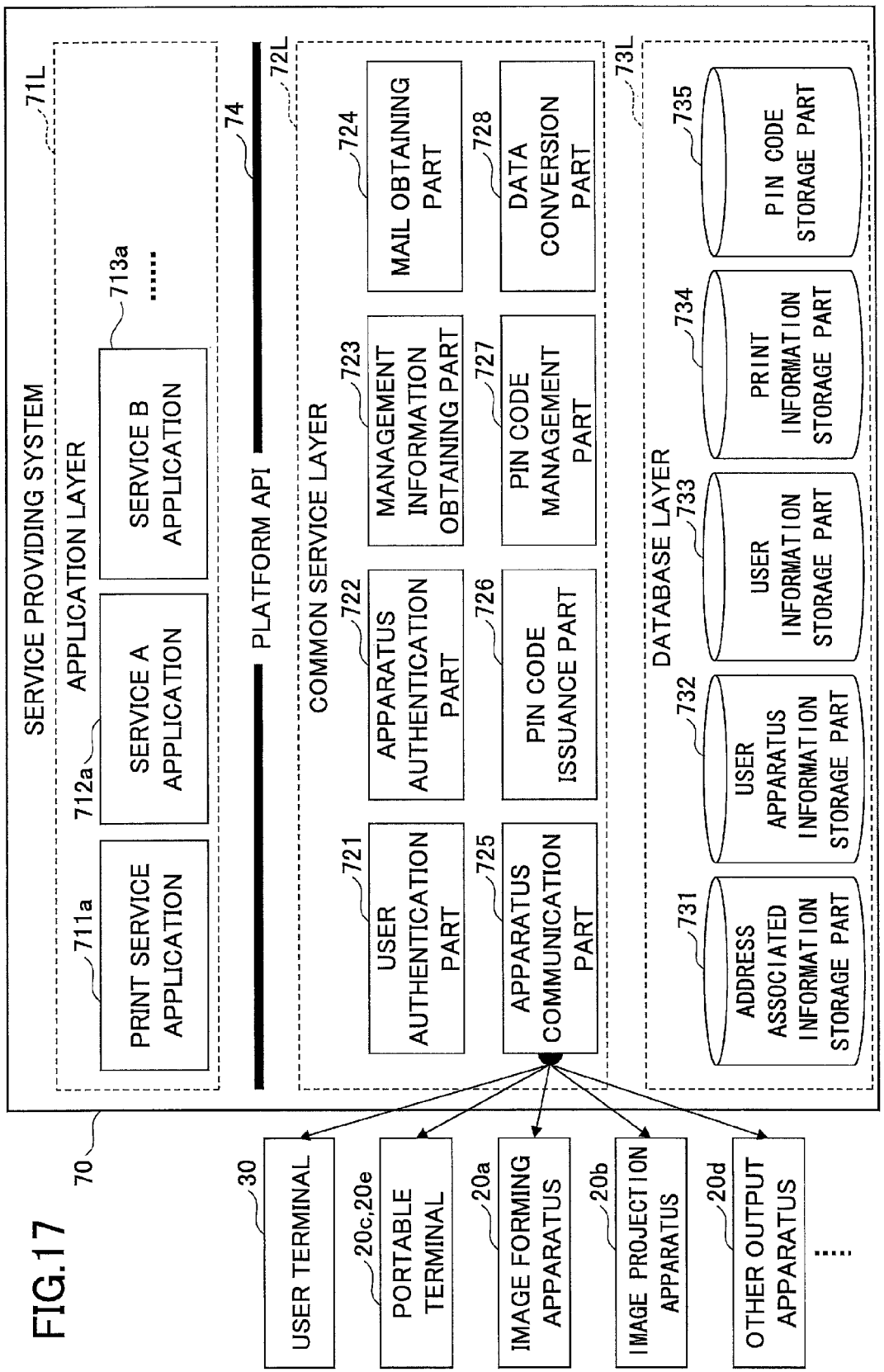
FIG. 17 shows a functional configuration example of a service providing system according to the fourth embodiment.

FIG. 17 shows a functional configuration example of the service providing system according to the fourth embodiment. In FIG. 17, the functions of the service providing system 70 are classified into an application layer 71L, a common service layer 72L, a database layer 73L and so forth.

In the application layer 71L, applications (hereinafter, referred to as "server applications") on a server side cooperating with the apparatuses such as the image forming apparatus 20a are installed. In FIG. 17, the application layer 71L includes server applications such as a print service application 711*a*, a service A application 712*a*, a service B application 713*a* and so forth.

The print service application 711*a* is a server application concerning cloud printing services. In the present embodiment, the print service application 711*a* is installed in the print service providing apparatus 711. The service A application 712*a* and the service B application 713*a* illustrate other service applications. In the present embodiment, the service A application 712*a* and the service B application 713*a* are installed in the service A providing apparatus 712 and the service B providing apparatus 713, respectively.

The common service layer 72L includes functions common to a plurality of server applications, basic functions used by a plurality of server applications and so forth, and is installed in the common service providing apparatus 72. The functions of the common service layer 72A can be invoked via a platform API 74. Basically, the platform API 74 is invoked by server applications in the application layer 71L. Note that the platform API 74 can be opened to a third vendor or the like other than an operator of the service providing system 70. In this case, the server applications can be installed by the third vendor of the like. That is, the server applications are appropriately developed by using the platform API 74 and are added.

In FIG. 17, the common service layer 72L includes a user authentication part 721, an apparatus authentication part 722, a management information obtaining part 723, a mail obtaining part 724, an apparatus communication part 725, a PIN code issuance part 726, a PIN code management part 727, a data conversion part 728 and so forth.

The user authentication part 721 authenticates a user. The apparatus authentication part 722 authenticates corresponding relationships among the image forming apparatus 20*a*, a user and an organization. An organization is such a concept that it can be a "company" in the respective embodiments described above, another association, or the like. Note that in the fourth embodiment, identification information corresponding to a "company" in the second embodiment is referred to as an "organization code". Therefore, authentication of corresponding relationships between a user and an organization is a process including verifying that the user and the image forming apparatus belong to the organization.

The management information obtaining part 723 obtains information stored in the database layer 73L in response to a request from the application layer 71L, for example. The mail obtaining part 724 obtains (receives) an electronic mail stored in the mail server 40 according to Post Office Protocol (POP) or the like. The apparatus communication part 725 communicates with various apparatuses. The PIN code issuance part 726 issues (generates) a PIN code. The PIN code management part 727 manages corresponding relationships between PIN codes and organization codes. The data conversion part 728 converts a data format. In the present embodiment, the data conversion part 728 generates print data based on print target data.

Note that the respective server applications in the application layer 71L and the respective parts in the common service layer 72L are implemented by processes carried out by the respective computers according to one or more programs installed in the respective computers included in the service providing system 70.

The database layer 73L includes a database (storage part) storing various information and is implemented by the database apparatus 73. In FIG. 17, the database layer 73L includes an address associated information storage part 731, a user apparatus information storage part 732, a user information storage part 733, a print information storage part 734, a PIN code storage part 735 and so forth.

The address associated information storage part 731 has the same configuration as the address associated information storage part 18 (FIG. 13). The user apparatus information storage part 732 has the same configuration as the user apparatus information storage part 64 (FIG. 15). The user information storage part 733 has approximately the same configuration as the user information storage part 52 (FIG. 6). Different points between the user information storage part 733 and the user information storage part 52 will be described later. The print information storage part 734 has the same configuration as the print information storage part (FIG. 7). The PIN code storage part 735 associates a PIN code generated by the PIN code generation part 726 or designated in a print request mail with the transmission source address of the print request mail and an organization code corresponding to the destination of the print request mail, and stores it.

Note that the manner of classification shown in FIG. 17 is one example. In order to implement the present embodiment, it is not necessary to classify the respective sets of software and the respective storage parts in the service providing system 70 in the layers as shown in FIG. 17. That is, as long as the same procedure as the present embodiment can be carried out, the layer relationship among the sets of software and the storage parts in the service providing system 70 is not limited to a specific one.

Figure 18:
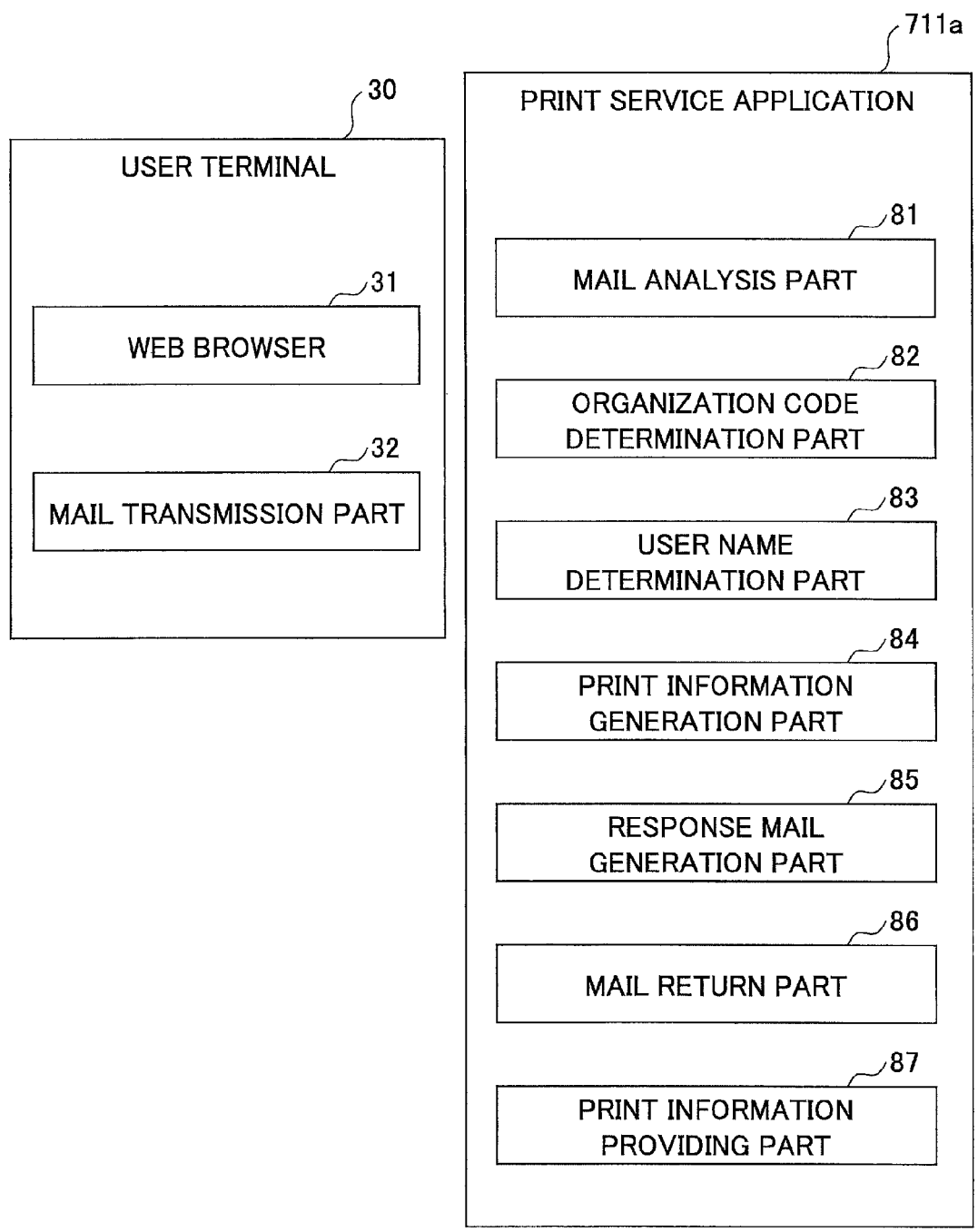
FIG. 18 shows a functional configuration example of a user terminal and a print service application according to the fourth embodiment.

FIG. 18 shows a functional configuration example of the user terminal and the print service application according to the fourth embodiment.

In FIG. 18, the user terminal 30 includes a Web browser 31, a mail transmission part 32 and so forth. The Web browser 31 is a common Web browser. The mail transmission part 32 transmits an electronic mail. In the present embodiment, the mail transmission part 32 transmits a print request mail. Note that the mail transmission part 32 is implemented by a process carried out by the user terminal 30 according a program called a "mailer".

The print service application 711*a* includes a mail analysis part 81, an organization code determination part 82, a user name determination part 83, a print information generation part 84, a response mail generation part 85, a mail return part 86, a print information providing part 87 and so forth.

The mail analysis part 81 analyses a print request mail and extracts print target data and so forth from the print request mail. The organization code determination part 82 determines the user name corresponding to the destination address of a print request mail. The user name determination part 83 determines the user name corresponding to the transmission source address of a print request mail. The functions of the print information generation part 84, the response mail generation part 85, the mail return part 86 and the print information providing part 87 are the same as the print information generation part 14, the response mail generation part 15, the mail return part 16 and the print information providing part 63 in FIG. 12.

Below, a procedure carried out in the fourth embodiment will be described. First, an outline of the procedure in the fourth embodiment will be described using a flowchart.

Figure 19:
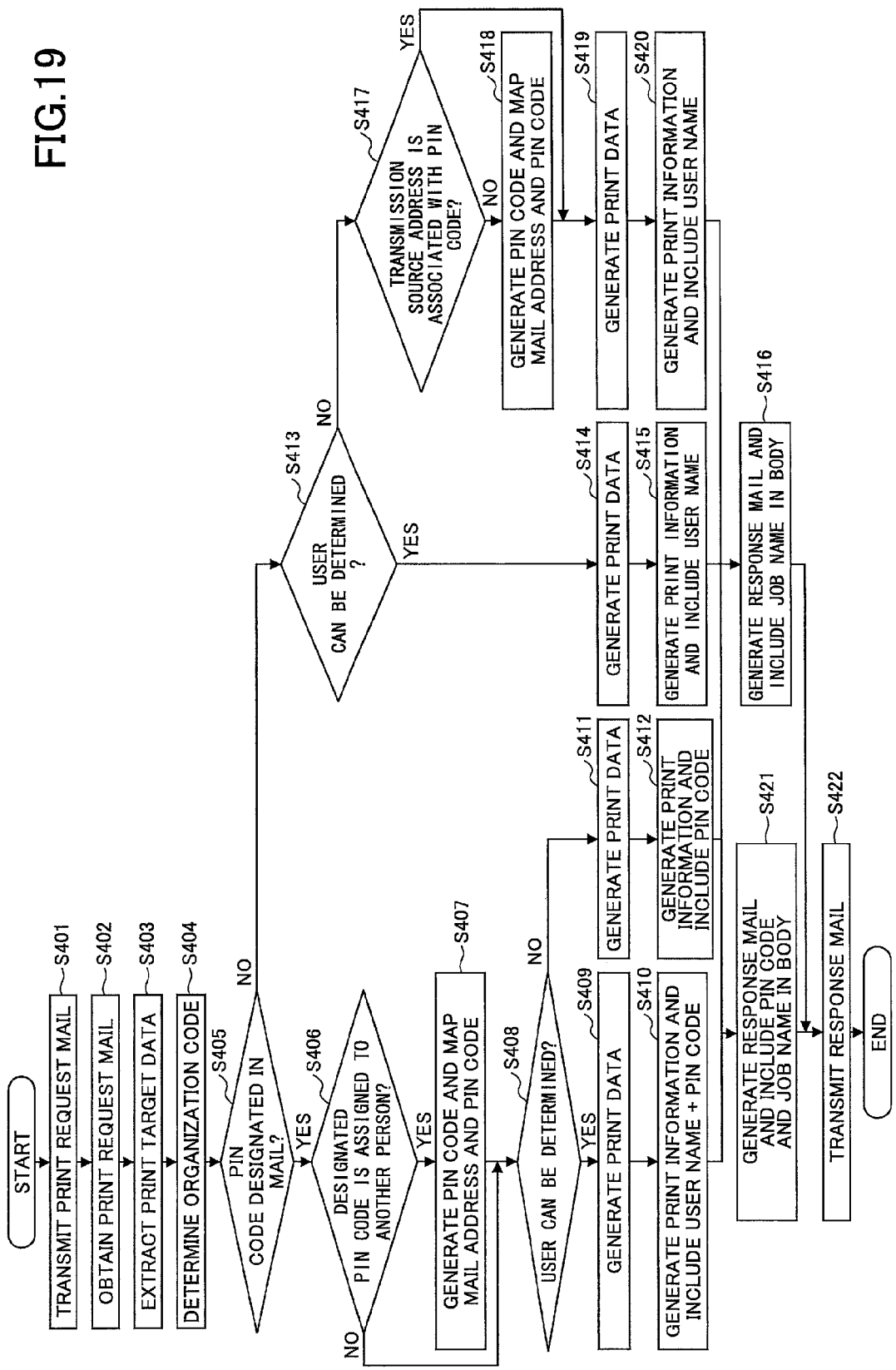
FIG. 19 is a flowchart illustrating one example of a procedure of registering print information using a print request mail.

FIG. 19 is a flowchart illustrating one example of a procedure of registering print information using a print request mail.

In step S401, in response to an instruction that is input by a user, the mail transmission part 32 in the user terminal 30 transmits a print request mail to a mail address assigned to the organization that the user belongs to. The contents of the print request mail are the same as those described above for the respective embodiments. That is, in the print request mail, a PIN code is designated if necessary.

Next, the mail obtaining part 724 in the service providing system 70 obtains the print request mail from the mail server 40 (S402). Next, the mail analysis part 81 in the print service application 711a extracts the print target data from the print request mail (S403). Next, the organization code determination part 82 in the print service application 711a determines the organization code corresponding to the print request mail based on the destination address of the print request mail and the address associated information storage part 731 (S404). That is, the organization code associated with the destination address and stored in the address associated information storage part 731 is obtained. Note that in the fourth embodiment, the configuration of the address associated information storage part 731 can be the same as the address associated information storage part 64 (FIG. 13). However, "company codes" in the address associated information storage part 64 are replaced by "organization codes".

Next, the PIN code issuance part 726 determines whether a PIN code is designated in the print request mail (S405). When a PIN code is designated in the print request mail (YES in S405), the PIN code issuance part 726 reads the PIN code storage part 735 and determines whether the PIN code (hereinafter, referred to as a "designated PIN code") is assigned to a user different from the sender of the print request mail (S406).

FIG. 20 shows a configuration example of the PIN code storage part according to the fourth embodiment. As shown in FIG. 20, the PIN code storage part 735 has an item of an organization code in addition to the PIN code storage part 19 in FIG. 9. When it is necessary to ensure uniqueness of PIN codes in one organization, it is determined in step S406 whether there is duplication of the designated PIN code with respect to the PIN codes associated with the organization code (hereinafter, referred to as a "target organization code") determined in step S404. When it is necessary to ensure uniqueness of PIN codes straddling a plurality of organizations, it is determined in step S406 whether there is duplication of the designated PIN code with respect to all the PIN codes stored in the PIN code storage part 735.

When the designated PIN code is assigned to another user (YES in S406), the PIN code issuance part 726 generates a PIN code not duplicate with the PIN codes stored in the PIN code storage part 735. The PIN code management part 727 associates the PIN code with the target organization code and the transmission source address of the print request mail, and stores it in the PIN code storage part 735 (S407). When the designated PIN code is not assigned to another user (NO in S406), the PIN code issuance part 726 does not generate a PIN code. Note that the procedure in steps S405 to S407 is the same as S201 to S203 of FIG. 8.

Next, the user name determination part 83 in the print service application 711a determines whether it is possible to determine the user name based on the transmission source address of the print request mail (S408). Specifically, it is determined whether the same address as the transmission source address is associated with the same organization code as the target organization code, and is stored in the user information storage part 733.

FIG. 21 shows a configuration example of the user information storage part according to the fourth embodiment. As shown in FIG. 21, the user information storage part 733 has an organization code and a "role" in addition to the items that the user information storage part 52 (FIG. 6) has.

The "role" is information for determining whether each user is an administrator or a user. An administrator means an administrator of an apparatus such as the image forming apparatus 20a cooperating with the service providing system 70. An administrator carries out, for example, operations for causing the image forming apparatus 20a and the service providing system 70 to cooperate with one another. A user is a user who uses a service provided by the service providing system 70.

In step S408, it is determined whether the user information storage part 733 stores user information including the same organization code as the target organization code and the same address as the transmission source address. When the corresponding user information is present, the user name (hereinafter, referred to as "target user name") included in the user information is obtained.

When the target user name is thus determined (YES in S408), the data conversion part 728 in the service providing system 70 generates print data concerning the print target data (S409). Note that it is not necessary to generate print data when the print target data has a format printable even without being converted.

Next, the print information generation part 84 generates print information (S410). In the print information, the job name, the target organization code, the target user name, the PIN code and the print data are included. The print information generation part 84 stores the generated print information in the print information storage part 734. The PIN code included in the print information is the PIN code designated in the print request mail or generated in step S407.

Next, the response mail generation part 85 in the print service application 711a generates a response mail (S421). The response mail includes, for example, the job name and the PIN code. Next, the mail return part 86 transmits the response mail to the transmission source address of the print request mail (S422).

On the other hand, when no user name can be determined in step S408 (NO in S408), print data is generated concerning the print target data as in step S409 (S411). Next, the print information generation part 84 generates print information (S412). In the print information, the job name, the target organization code, the PIN code and the print data are included. The print information generation part 84 stores the generated print information in the print information storage part 734. The PIN code included in the print information is the PIN code designated in the print request mail or generated in step S407. Next, steps S421 and S422 are executed.

On the other hand, when no PIN code is designated in the print request mail in step S405 (NO in S405), the user name determination part 83 determines whether it is possible to determine the target user name based on the transmission source address of the print request mail, as in step S408 (S413).

When the target user name is thus determined (YES in S413), print data is generated concerning the print target data, as in step S409 (S414). Next, the print information generation part 84 generates print information (S415). In the print information, the job name, the target organization code, the target user name and the print data are included. The print information generation part 84 stores the generated print information in the print information storage part 734. Next, the response mail generation part 85 generates a response mail (S416). The response mail includes, for example, the job name. Next, step S422 is executed.

Further, when no user name can be determined in step S413 (NO in S413), the PIN code issuance part 726 determines whether the same address as the transmission source address of the print request mail is associated with a PIN code in the PIN code storage part 735 (step S417). When the same address as the transmission source address is not associated with a PIN code (NO step S417), the PIN code issuance part 726 and the PIN code management part 727 carry out the same process as step S407 (S418). That is, a new PIN code is generated and is stored in the PIN code storage part 735.

In case of YES in S417 or subsequent to S418, the same processes as steps S411 and S412 are carried out (S419, S420), and steps S421 and S422 are executed.

Thus, also according to the fourth embodiment, a response mail including a PIN code is returned for a guest user at any time. On the other hand, for an authorized user, a response mail is returned in which, when a PIN code is designated in the print request mail, the PIN code or a PIN code generated in such a manner as to avoid duplication with a PIN code of another user. In other words, in a case of an authorized user, when a PIN code is not designated in a print request mail, no PIN code is issued for the authorized user.

Next, a case will be described where print information is registered through the Web browser 31 that the user terminal 30 has. That is, in the fourth embodiment, print information can be registered by a way different from using a print request mail.

Figure 22:
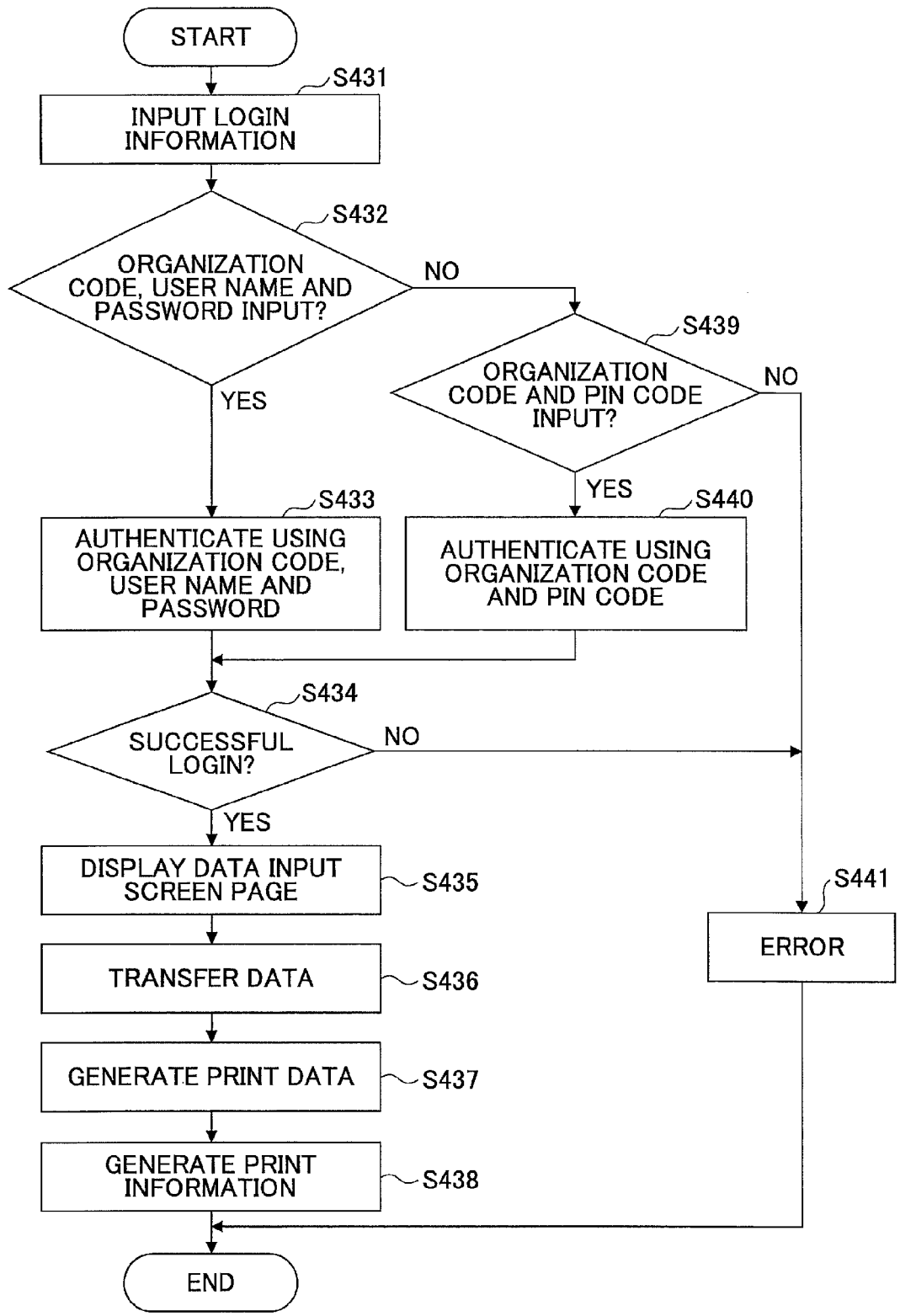
FIG. 22 is a flowchart illustrating one example of a procedure of registering print information using a Web interface.

FIG. 22 is a flowchart illustrating one example of a procedure of registering print information using a Web interface. It is assumed that in the initial state of FIG. 22, a login screen page for the service providing system 70 is displayed by the Web browser 31 in the user terminal 30.

In step S431, the Web browser 31 receives login information that is input by a user through the login screen page.

Figure 23:
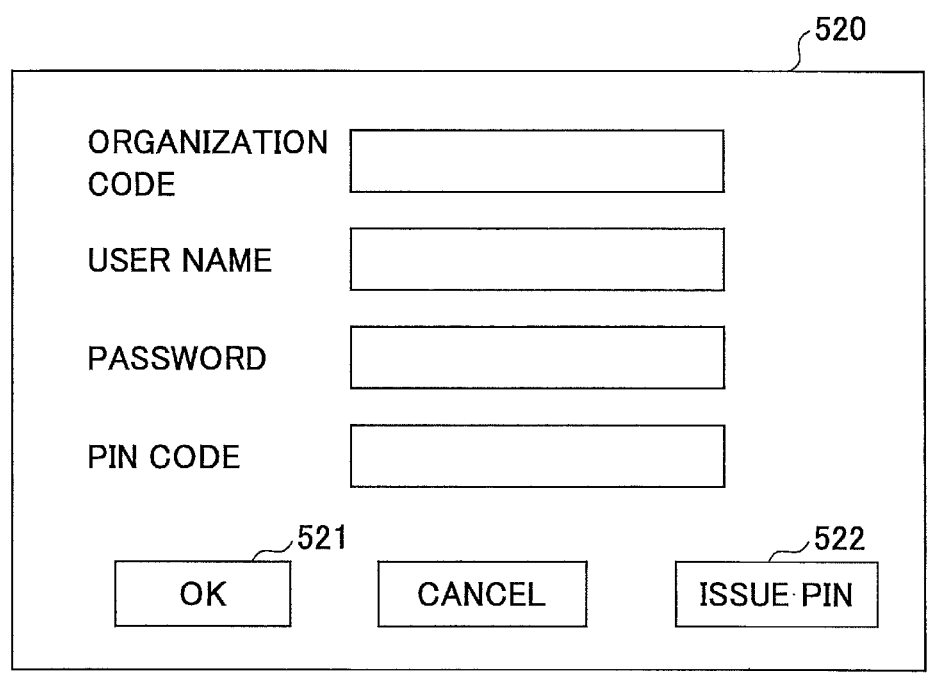
FIG. 23 shows a display example of a login screen page shown in the user terminal according to the fourth embodiment.

FIG. 23 shows a display example of the login screen page shown in the user terminal according to the fourth embodiment. In FIG. 23, the login screen page 520 includes input areas for an organization code, a user name, a password, a PIN code and so forth. The login screen page 520 further includes an OK button 521, an "issue PIN" button 522 and so forth.

There are two patterns for login. In a pattern 1, an organization code, a user name and a password are designated. In a pattern 2, an organization code and a PIN code are designated. However, when the user terminal 30 is connected with the card reader, or the user terminal 30 includes the card reader, it is also possible that a login is carried out using the card 90. Note that in a case of the pattern 2, the user needs to previously have the PIN code issued. The user presses the "issue PIN" button 522 to have a PIN code issued. A procedure when the "issue PIN" button 522 is pressed will be described later.

When the OK button 521 on the login screen page 520 is pressed, the Web browser 31 determines whether an organization code, a user name and a password are input to the login screen page 520 (S432). Note that a process carried out by the Web browser 31 is based on definitions included in a Web page (HyperText Markup Language (HTML) data and/or the like) causing the Web browser 31 to display the login screen page.

When an organization code, a user name and a password are input to the login screen page 520 (YES in S432), the Web browser 31 receives authentication by the service providing system 70 based on the organization code, the user name and the password (S433). That is, the organization code, the user name and the password are transmitted to the user authentication part 721. The user authentication part 721 carries out authentication based on whether the same combination of the organization code, the user name and the password is stored in the user information storage part 733.

When the authentication is successful and login is permitted (YES in S434), the Web browser 31 displays a data input screen page (S435). The data input screen page is used for causing a file to be printed to be selected from among the files stored in the user terminal 30. When a file is thus selected through the data input screen page, the Web browser 31 transfers the data stored in the file to the service providing system 70 (S436).

When receiving the data, the service providing system 70 carries out the same processes as steps S406 and S407 in FIG. 19 (S437 and S438). As a result, print information based on the data is stored in the print information storage part 734.

On the other hand, when an organization code, a user name and a password are not input to the login screen page 520 (NO in S432), the Web browser 31 determines whether what is input is an organization code and a PIN code (S439). When what is input is an organization code and a PIN code (YES in S439), the Web browser 31 receives authentication by the service providing system 70 based on the organization code and the PIN code (S440). That is, authentication is carried out based on whether the same combination of the organization code and the PIN code is registered in the service providing system 70.

When the authentication is successful and login is permitted (YES in S434), the Web browser 31 executes step S435 and the subsequent steps. However, in this case, in step S438, the same process as step S412 in FIG. 19 is carried out. As a result, print information including the organization code and the PIN code is stored in the print information storage part 734.

Note that when the input pattern to the login screen page 520 is neither the pattern 1 nor the pattern 2 (NO in S439) or the login has failed (NO in S434), the Web browser 31 displays an error screen page (S441). In this case, no print information is registered.

Next, a process of issuing a PIN code through the Web interface carried out before receiving authentication using an organization code and the PIN code will be described.

Figure 24:
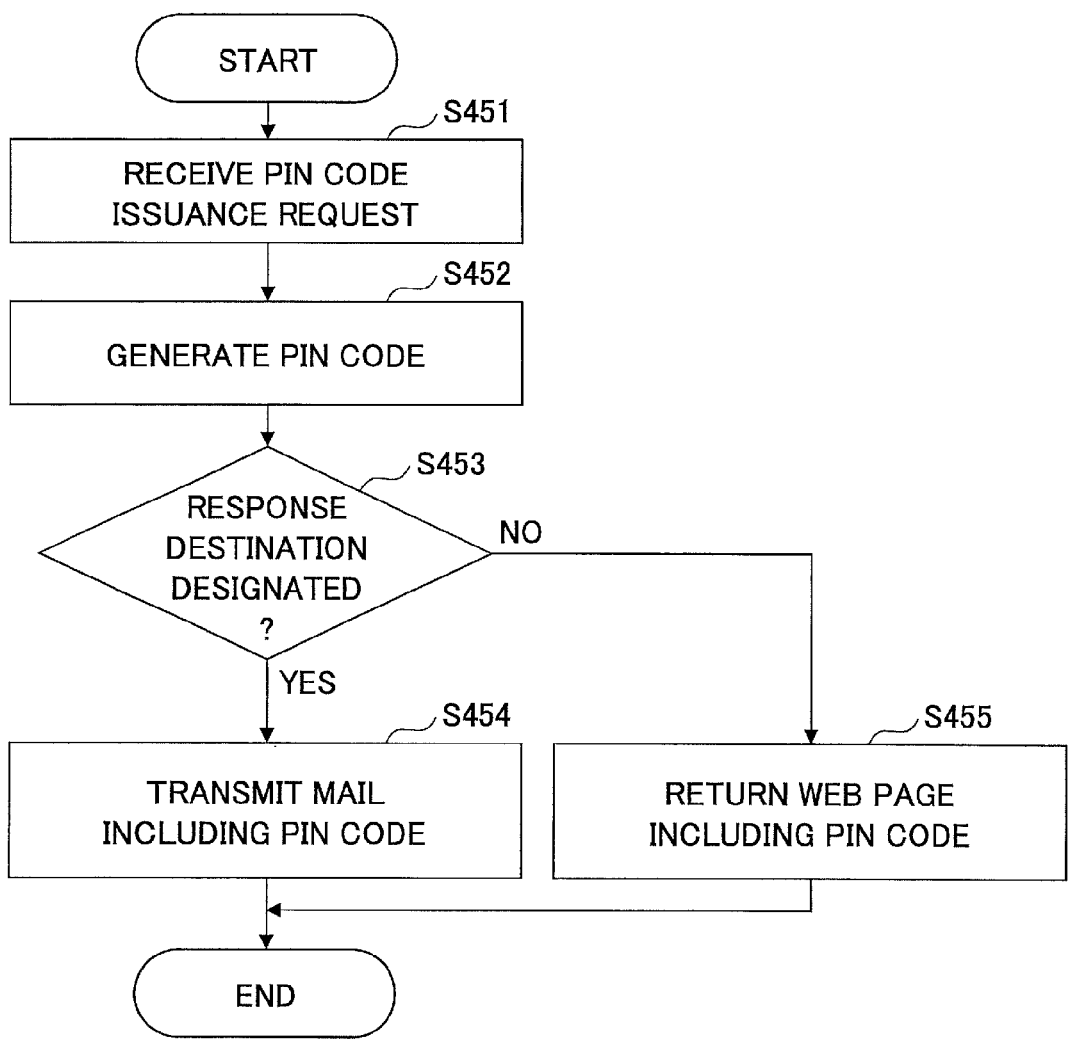
FIG. 24 is a flowchart illustrating one example of a procedure of issuing a PIN code through the Web interface.

FIG. 24 is a flowchart illustrating one example of a procedure of issuing a PIN code through the Web interface. It is assumed that in the initial state in FIG. 24, the login screen page 520 (FIG. 23) is displayed by the Web browser 31 in the user terminal 30.

In step S451, the Web browser 31 receives a request to issue a PIN code (S451). A request to issue a PIN code is received as a result of, after an organization code (hereinafter, referred to as a "target organization code") is input to the login screen page 520, the issue PIN button 522 being pressed. Note that such a configuration can also be provided that, in response to the issue PIN button 522 being pressed, the Web browser 31 displays a response destination address designation screen page such as that shown in FIG. 25.

Figure 25:
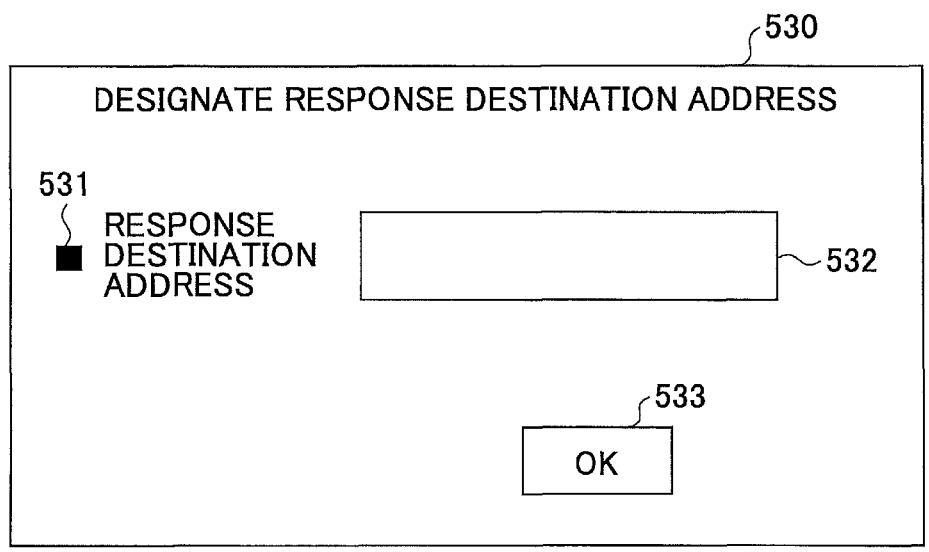
FIG. 25 shows a display example of a response destination address designation screen page shown in the user terminal.

FIG. 25 shows a display example of the response destination address designation screen page shown in the user terminal. In FIG. 25, the response destination address designation screen page 530 includes a check button 531, an address input area 532, an OK button 533 and so forth.

The address input area 532 receives an input of a mail address (hereinafter, referred to as "response destination address") of a response destination of an electronic mail including a PIN code to be issued. The check button 531 receives an instruction as to whether to receive, by an electronic mail, a notification of a PIN code to be issued. When the check button 531 is checked, an input to the address input area 532 is allowed.

When the OK button 533 is pressed, the Web browser 31 transmits a request to issue a PIN code to the service providing system 70 including the organization code that is input through the login screen page 520. When a response destination address is input to the response destination address designation screen page 530, the request to issue a PIN code also includes the response destination address.

Next, the PIN code issuance part 726 in the service providing system 70 generates a new PIN code avoiding duplication with the existing PIN codes (S452). The PIN code is associated with the target organization code and is stored in the PIN code storage part 735. Here, it is not necessary to store the mail address associated with the PIN code.

Next, the PIN code management part 727 branches the process depending on whether a response destination address is designated in the request to issue a PIN code (S453). When a response destination address is designated (YES in S453), the PIN code management part 727 transmits an electronic mail including the generated PIN code to the response destination address (S454). When no response destination address is designated (NO in S453), the PIN code management part 727 returns a Web page displaying the generated PIN code to the Web browser 31 in a manner of including the Web page in a response to the request to issue a PIN code (S455).

In any case, the user can check the PIN code. The user can carry out a login in the pattern 2 described in FIG. 22 using the PIN code.

Next, procedures concerning some scenarios included in the procedures described above using the flowcharts will be described using sequence diagrams.

Figure 26:
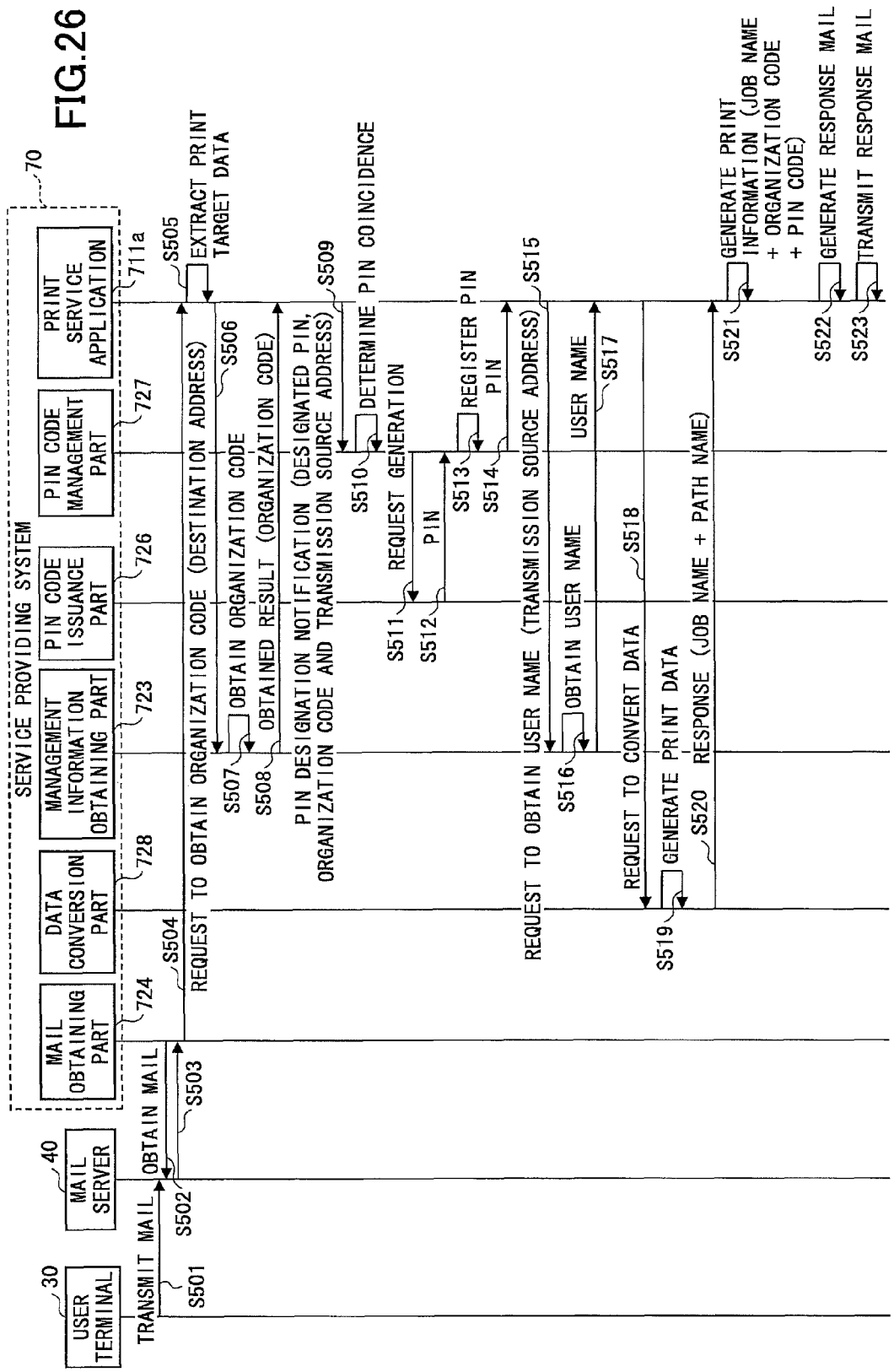
FIG. 26 is a sequence diagram illustrating one example of a procedure of registering print information and issuing a PIN code using a print request mail.

FIG. 26 is a sequence diagram illustrating one example of a procedure of registering print information and issuing a PIN code using a print request mail. That is, FIG. 26 is a sequence diagram illustrating a procedure in a case where a PIN code is designated in a print request mail (YES in S406) and the user name is determined (case of YES in S408) in the procedure of FIG. 19.

In step S501, the mail transmission part 32 in the user terminal 30 transmits a print request mail in which a PIN code is designated to the mail address assigned to the organization where the user is present. The print request mail is transferred according to, for example, Simple Mail Transfer Protocol (SMTP) to the mail server 40.

The mail obtaining part 724 in the service providing system 70 obtains the print request mail stored in the mail server 40 according to, for example, Post Office Protocol (POP) (S502, S503). The mail obtaining part 724 transfers the print request mail to the print service application 711*a* (S504). The mail analysis part 81 in the print service application 711*a* extracts the print target data from the print request mail (S505).

Next, the organization code determination part 82 in the print service application 711*a* requests the management information obtaining part 723 to obtain the organization code corresponding to the destination address of the print request mail (S506). The management information obtaining part 723 obtains the organization code associated with the destination address and stored in the address associated information storage part 731 (see FIG. 13) (S507), and returns the organization code (hereinafter, referred to as "target organization code") to the organization code determination part 82 (S508).

Next, the user name determination part 83 in the print service application 711*a* designates the PIN code designated in the print request mail (hereinafter, referred to as a "designated PIN code"), the target organization code and the transmission source address of the print request mail and sends notification indicating that the PIN code is designated to the PIN code management part 727 (S509). The PIN code management part 727 reads the PIN code storage part 735 for the designated PIN code in the notification and determines whether duplication occurs (S510). When the designated PIN code is duplicate with another PIN code, the PIN code management part 727 requests the PIN code generation part 726 to issue a PIN code (S511). At this time, the notification to the PIN code issuance part 726 can includes a list of the already issued PIN codes. The PIN code issuance part 726 generates a new PIN code and returns the PIN code to the PIN code management part 727 (S512). When the PIN code is not duplicate with the other PIN codes, the PIN code management part 727 associates the PIN code with the target organization code and the transmission source address, and registers it in the PIN code storage part 735 (S513). Next, the PIN code management part 727 returns the PIN code to the user name determination part 83 (S514). Note that when no duplication of the PIN code is detected in step S510, steps S511 and S512 are not executed, the designated PIN code is registered in the PIN code storage part 735, and the designated PIN code is returned to the user name determination part 83 (S514).

Next, the user name determination part 83 in the print service application 711*a* requests the management information obtaining part 723 to obtain the user name corresponding to the transmission source address of the print request mail (S515). The management information obtaining part 723 tries to obtain the user name associated with the transmission source address and stored in the user information storage part 733 (FIG. 21) (S516). Here, it is assumed that the corresponding user name is obtained. Therefore, the management information obtaining part 723 returns a response including the corresponding user name (hereinafter, referred to as a "target user name") to the user name determination part 83 (S517).

Next, the print information generation part 84 in the print service application 711*a* requests the data conversion part 728 to convert the print target data into print data (S518). The data conversion part 728 generates print data based on the print target data and stores the generated data in an auxiliary storage device (S519). Note that the data conversion part 728 assigns identification information (data ID) to the generated print data. According to the fourth embodiment, the data ID is used as a job name. Next, the data conversion part 728 returns a response including the job name and a path name of a file in which the print data is stored to the print information generation part 84 (S520).

The print information generation part 84 generates print information that includes the job name, the target organization code, the target user name, the PIN code and the path name of the file storing the print data (S521). Note that, for the above-mentioned configuration, it is described that print information includes print data. However, it is sufficient that print information includes information for making it possible to identify print data such as the path name of print data instead of the print data itself. Therefore, in the item of "print data" in FIG. 14, "the path name of print data" can be stored.

Next, the response mail generation part 85 in the print service application 711*a* generates a response mail including the job name and the PIN code (S522). Next, the mail return part 86 transmits the response mail to the transmission source address of the print request mail (S523).

Figure 27:
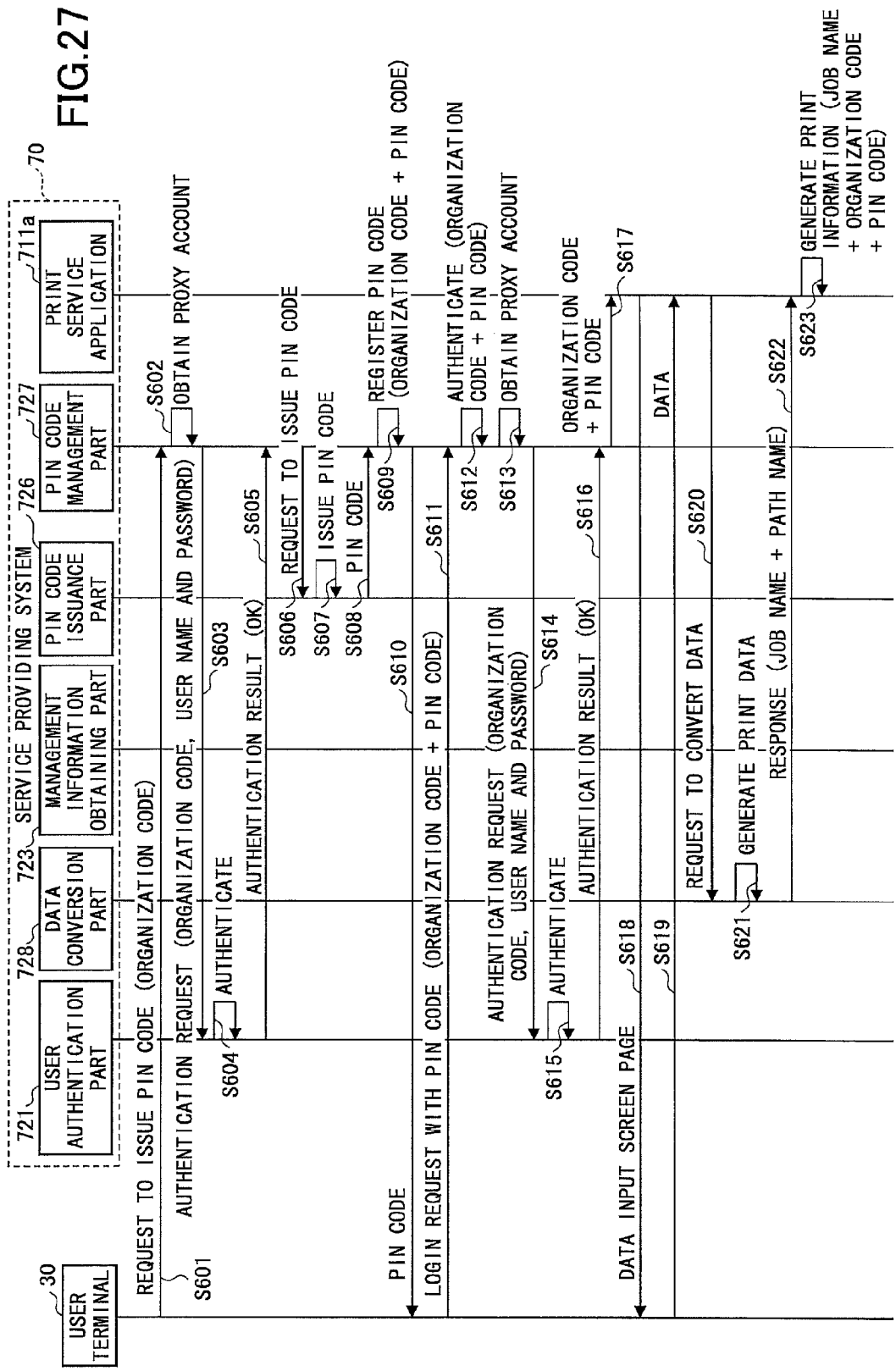
FIG. 27 is a sequence diagram illustrating one example of a procedure of issuing a PIN code and registering print information using the Web interface.

Next, FIG. 27 is a sequence diagram illustrating one example of a procedure of issuing a PIN code and registering print information using the Web interface. That is, FIG. 27 illustrates a procedure of a case of having a PIN code issued through the procedure of FIG. 24, logging in by using an organization code and a PIN code in FIG. 22, and registering print information.

In step S601, in response to inputting to the login screen page 520, the response destination address designation screen page 530 and so forth, the Web browser 31 in the user terminal 30 designates an organization code and transmits a request to issue a PIN code to the service providing system 70.

In response to the request to issue a PIN code, the PIN code management part 727 obtains a proxy account from a proxy account management table (S602). A proxy account is used instead of a true account (the user name and the password) of a user. That is, there is likelihood that a user who requests issuance of a PIN code does not have an account. Therefore, the user cannot receive authentication by the user authentication part 721, and as a result, cannot log into the service providing system 70. This is the reason why a proxy account is used.

FIG. 28 shows a configuration example of the proxy account management table. In FIG. 28, in the proxy account management table, user names and passwords of proxy accounts are registered in a manner of being associated with organization codes. Therefore, in step S602, the user name and the password corresponding to the organization code designated in the request to issue a PIN code are obtained.

Note that the user name and the password of the administrator of each organization can be used as a proxy account.

Next, the PIN code management part 727 designates the target organization code, and the user name and the password of the proxy account, and transmits an authentication request to the user authentication part 721 (S603). The user authentication part 721 reads the user information storage part 733 with regard to the organization code, the user name and the password, and carries out authentication (S604). Next, the user authentication part 721 returns the authentication result to the PIN code management part 727 (S605).

When the authentication is successful, the PIN code management part 727 requests the PIN code issuance part 726 to issue a PIN code (S606). The PIN code issuance part 726 generates a PIN code (S607), and returns the PIN code to the PIN code management part 727 (S608). The PIN code management part 727 associates the target organization code and the PIN code with each other and registers them in the PIN code storage part 735 (FIG. 20) (S609). Next, the PIN code management part 727 transmits a response including the PIN code to, for example, the user terminal 30 (S610). The form of the response can be an electronic mail or a Web page. In a case of an electronic mail, an electronic mail including the PIN code is transmitted to the response destination address designated in the request to issue a PIN code. Therefore, there is likelihood that the electronic mail is received by a terminal other than the user terminal 30.

The user who thus obtains the PIN code can log into the service providing system 70 by using the PIN code. Then, the user inputs the organization code and the PIN code to the login screen page 520 (FIG. 23) displayed by the Web browser 31 of the user terminal 30 and presses the OK button 521. In response to the OK button 521 being pressed, the Web browser 31 transmits a login request by using the PIN code to the service providing system 70 (S611). In the login request, the organization code and the PIN code that are input to the login screen page 520 are designated. However, when the uniqueness of PIN codes straddling the organizations is guaranteed, only a PIN code can be designated. In this case, in the process that will be described below, information determined from the combination of the organization code and the PIN code can be determined only from the PIN code.

The PIN code management part 727 in the service providing system 70 authenticates the organization code and the PIN code designated in the login request (S612). Specifically, it is determined whether the same combination of the organization code and the PIN code is stored in the PIN code storage part 735. When the same combination is stored in the PIN code storage part 735, the authentication is successful. When the same combination is not stored in the PIN code storage part 735, the authentication fails.

When the authentication of the PIN code is successful, authentication using the proxy account is carried out in the same procedure as steps S602 to S605 (S613 to S616). When the authentication is successful, login is successful. Therefore, the PIN code management part 727 notifies the print service application 711*a* of the organization code and the PIN code by which login is successful (S617).

The print service application 711*a* returns a Web page displaying a data input screen page to the user terminal 30 in a manner of including the Web page in a response to the login request that uses the PIN code (S618). The Web browser 31 in the user terminal 30 displays the data input screen page based on the Web page.

When a file is selected through the data input screen page thus displayed in the user terminal 30, the Web browser 31 transmits the data stored in the file to the print service application 711*a* (S619). Next, in the same procedure as steps S518 to S521 in FIG. 26, print data is generated for the thus transmitted data, and print information including the path name of the print data, the job name, the organization code and the PIN code is stored in the print information storage part 734 (S620 to S623).

Figure 29:
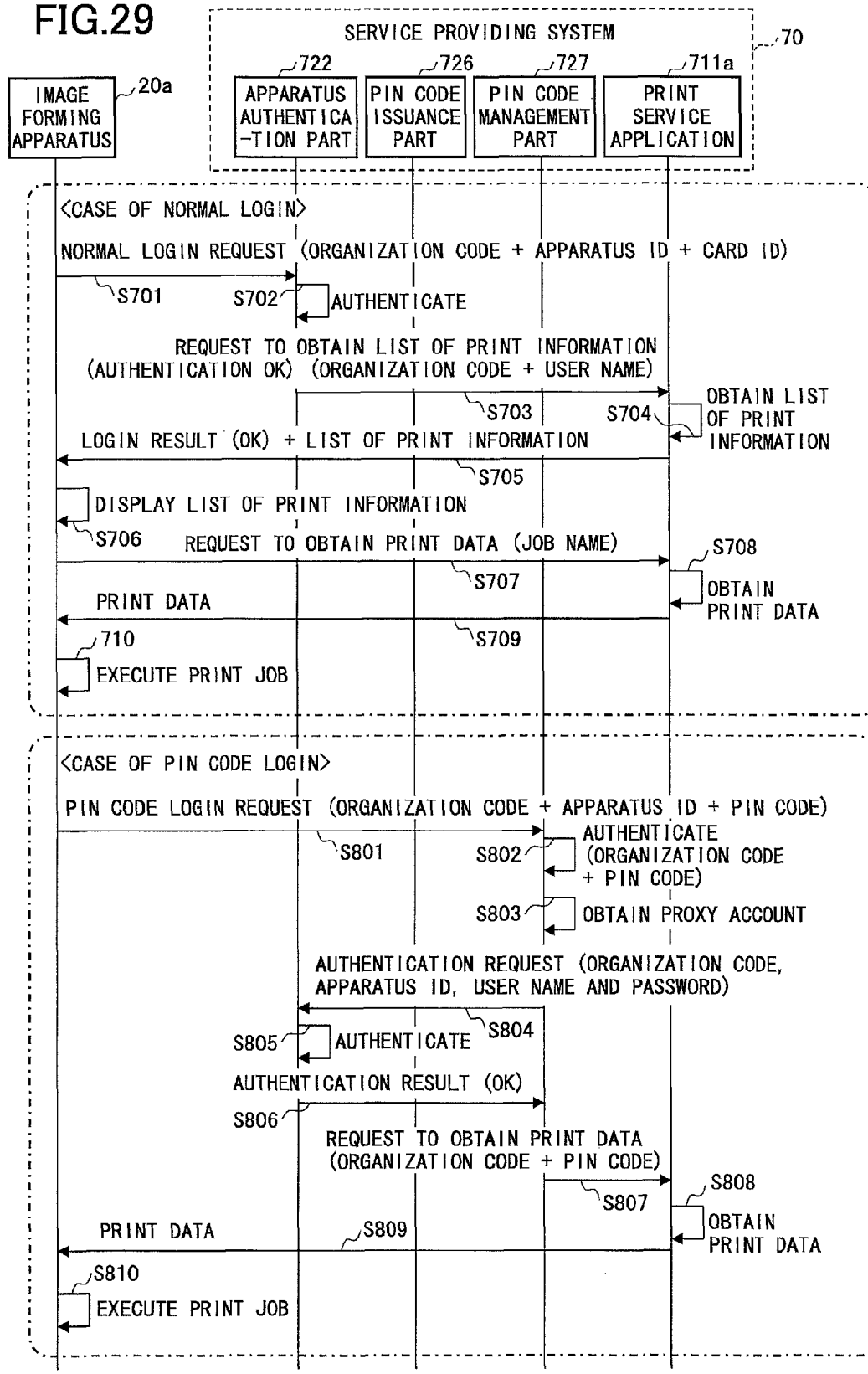
FIG. 29 is a sequence diagram illustrating one example of a procedure of outputting print data.

Next, FIG. 29 is a sequence diagram illustrating one example of a procedure of outputting print data. FIG. 29 shows a procedure of causing the image forming apparatus 20*a* to carry out a print job based on print data included in print information registered in the processes of FIG. 26 or 27.

In FIG. 29, steps S701 to S710 are a procedure carried out when a normal login (login based on an organization code, an apparatus ID and a card ID) is carried out from the image forming apparatus 20*a*. On the other hand, steps S801 to S810 are a procedure carried out when a login using a PIN code (login based on an organization code, an apparatus ID and a PIN code) is carried out from the image forming apparatus 20*a*.

When a user sets the card 90 in the card reader 28 in a state where the login screen page 510 (FIG. 11) is displayed on the operation panel 25 of the image forming apparatus 20*a*, the authentication control part 221 transmits a login request to the service providing system 70 (S701). In the login request, the organization code, the apparatus ID and the card ID are designated. The organization code and the apparatus ID can be previously stored in the HDD 214 of the image forming apparatus 20*a*. However, the organization code can be input through the login screen page 510. In this case, the login screen page 510 can have an input area for an organization code.

When the login request is received by the service providing system 70, the apparatus authentication part 722 carries out authentication (S702). Specifically, the authentication is successful when two conditions are satisfied. A first one of the two conditions is that the same combination of the organization code and the apparatus ID as the combination designated in the login request is stored in the user apparatus information storage part 732 (see FIG. 15). The second one of the two conditions is that the same combination of the organization code (hereinafter, referred to as a "target organization code) and the card ID as the combination designated in the login request is stored in the user information storage part 733 (see FIG. 21). Note that the user name associated with the card ID and stored in the user information storage part 733 will be referred to as a "target user name", hereinafter.

When the authentication is successful, the apparatus authentication part 722 designates the target organization code and the target user name and transmits a request to obtain a list of print information to the print service application 711a (S703). In the request to obtain a list of print information, the authentication result, the target organization code, the target user name and so forth are designated.

The print information providing part 87 in the print service application 711a obtains a list of print information including the target organization code and the target user name from the print information storage part 734 (S704). Note that, here, it is not necessary to obtain the substance of the print data. Next, the print information providing part 87 returns information indicating a successful login and the obtained list of print information (sets of print information) to the image forming apparatus 20a (S705).

The print information obtaining part 222 in the image forming apparatus 20a displays a list of the job names and so forth included in the returned respective sets of print information on the operation panel 25 (S706). When one or more job names are selected from among the list, the print information obtaining part 222 transmits a request to obtain the print data corresponding to the job names to the print service application 711a (S707). The print information providing part 87 in the print service application 711a reads the print information storage part 734 and obtains the print data associated with the job names designated in the request from the print information storage part 734 (S708). Next, the print information providing part 87 returns the obtained print data to the image forming apparatus 20a (S709).

The print control part 223 in the image forming apparatus 20a controls execution of the print jobs concerning the print data (S710). As a result, sheets of paper on which the print data is printed are output.

Next, a case where a login using a PIN code is carried out will be described.

When a PIN code is input through the login screen page 510 (FIG. 11) displayed on the operation panel 25 of the image forming apparatus 20a and the OK button 511 is pressed, the authentication control part 221 transmits a login request to the service providing system 70 (S801). In the login request, the organization code, the apparatus ID and the PIN code are designated.

Next, the same processes as steps S612 to S616 of FIG. 27 are carried out (S802 to S806). Next, the PIN code management part 727 designates the organization code and the PIN code by which login is successful and transmits a request to obtain print data to the print service application 711a (S807).

Next, the print information providing part 87 in the print service application 711a reads the print information storage part 734 and obtains the print data associated with the organization code and the PIN code designated in the request to obtain print data from the print information storage part 734 (S808). Next, the print information providing part 87 returns the obtained print data to the image forming apparatus 20a (S809).

The print control part 223 in the image forming apparatus 20a controls the print job concerning the print data (S810). As a result, sheets of paper on which the print data is printed are output.

Note that in FIG. 29, such an example has been described that in case of a login using a PIN code, a list of print information is not provided to the image forming apparatus 20a. This is because a user who logs using a PIN code is a guest user who temporarily uses the image forming apparatus 20a, an authorized user who has forgotten the card 90 or the like, and it is highly likely that the amount of registered print information is small. That is, it is highly likely that a guest user wishes to print all of the registered print information. However, it is also possible that the same process as those of step S705 and the subsequent steps can be carried out even in case of a login using a PIN code. That is, a set of print information to be printed can be selected by a user from among the sets of print information associated with a PIN code designated in the login.

Note that in the respective embodiments described above, the management server 10, the authentication server 50 and the storage server 60, or the service providing system 70 are/is one example of an information processing system. Print data is one example of output data. That is, each of the embodiments described above can also be applied to a case where data other than print data is output to an image forming apparatus or another apparatus. The mail reception part 11 and the mail obtaining part 724 are examples of an output data reception part. The address confirmation part 12 and the user name determination part 83 are examples of a determination part. A user name is one example of user identification information. A PIN code is one example of data identification information. That is, a PIN code is generated for each print request. Therefore, a PIN code can be said to be information for identifying data to be printed. The print information generation part 14 and the print information generation part 84 are examples of a storage process part. The mail return part 16 and the mail return part 86, or the PIN code management part 727 are/is one example (s) of a notification part. The print information providing part 63 and the print information providing part 87 examples of a transmission part. The user information storage part 52 and the user information storage part 733 are examples of a user information storage part. The print information storage part 62 and the print information storage part 734 are examples of a data storage part. A print request mail or print target data included in a print request mail is one example of mail data. The PIN code storage part 735 is one example of a data identification information storage part. The PIN code management part 727 is one example of a first reception part and a second reception part. The user authentication part 721 is one example of a third reception part.

Although the information processing systems, the information processing methods and the non-transitory computer readable information recording mediums have been described with reference to the embodiments, the present invention is not limited to the embodiments, and variations and modifications exist within the scope and spirit of the invention as described and defined in the following claims.

The present patent application is based on Japanese Priority Application No. 2013-099973 filed May 10, 2013, the entire contents of which are hereby incorporated herein by reference.

PRIOR ART REFERENCES

Japanese Laid-Open Patent Application No. 2004-236348
Japanese Laid-Open Patent Application No. 2001-051915

The invention claimed is:

1. An information processing system which includes one or more information processing apparatuses, the information processing system comprising:
a memory having computer readable instructions stored thereon; and
at least one processor configured to execute the computer readable instructions to,
receive, via a network, a mail from a user, the mail including output data,
determine whether the user is registered using data identification information or an address associated with the received mail, the data identification information being a first PIN code generated in response to the receiving of the mail or associated with the registered user,
associate the output data with authentication information based on results of the determination, the association including retrieving a user identification information and password and/or generating a second PIN code,
generate print information, the print information including a job name, a user mode based on the results of the determination, the user mode indicating whether the user is registered or a guest user, and the output data,
when the results of the determination indicates that the user is registered, associate user identification information for identifying the user with the print information, and store the user identification information in the memory,
when the results of the determination indicates that the user is the guest user, associate the data identification information with the print information, and store the data identification information in the memory,
notify the user of the data identification information via the network, and
transmit, via the network, the print information associated with the user identification information or the data identification information based on the results of the determination, to at least one printer, the printer including a card reader, wherein
the printer is configured to,
authenticate the user based on the associated authentication information and information received from the card reader when the user mode indicates that the user is registered, and obtain from the memory the generated print information that is associated with the stored user identification information, and
authenticate the user based on the associated authentication information and a user input of the first PIN code when the user mode indicates that the user is the guest user, and obtain from the memory the generated print information that is associated with the stored data identification information.

2. The information processing system as claimed in claim 1, wherein the at least one processor is further configured to:
determine whether the received mail includes a request to issue the data identification information;
associate the data identification information with the output data; and
store the data identification information and the output data in the memory when the data identification information or the request to issue the data identification information is designated in the received mail.

3. The information processing system as claimed in claim 2, wherein the at least one processor is further configured to:
determine whether the user identification information is to be associated with the output data from user information stored in the memory;
associate the user identification information with the output data;
store the user identification information when the user identification information based on results of determination of whether the user identification information is to be associated with the output data,
the user information is associated with first identification information associated with one or more users;
determine the first identification information based on address information of a destination of the received mail; and
determine the user identification information from the user information associated with the determined first identification information.

4. The information processing system as claimed in claim 3, wherein the at least one processor is further configured to:
receive the first identification information from a terminal via the network; and
notify the user of the data identification information when the same first identification information as the received first identification information is stored in the memory or based on the results of the determination of the first identification information using the address information of the destination.

5. The information processing system as claimed in claim 4, wherein the at least one processor is further configured to:
receive the first identification information and the user identification information from the terminal via the network;
receive the output data from the terminal via the network;
determine the user identification information from an address information of a sender of the mail and the address information of the destination when the mail is received; and
determine the user identification information from the stored user information using the first identification information and the received user identification information when the output data is received from the terminal.

6. The information processing system as claimed in claim 1, wherein the at least one processor is further configured to:
store the notified data identification information in the memory; and
receive, via the network, second data identification information from the user;
associate the second data identification information with the output data; and
store the second data identification information and the output data in the memory when the second data identification information is the same as the notified data identification information.

7. The information processing system as claimed in claim 1, wherein the data identification information is included in the received mail.

8. The information processing system as claimed in claim 1, wherein the at least one processor is further configured to:
based on results of the authentication, display a list of job names associated with the authenticated user, and
receive an input from the authenticated user regarding a selected job name from the list of job names to print.

9. An information processing method executed by an information processing system which includes one or more information processing apparatuses, the information processing method comprising:
receiving, using at least one processor, a mail from a user, the mail including output data via a network;
determining, using the at least one processor, whether the user is registered using data identification information or an address associated with the received mail, the data identification information being a first PIN code generated in response to the receiving of the mail or associated with the registered user;
associating, using the at least one processor, the output data with authentication information based on results of the determination, the association including retrieving a user identification information and password and/or generating a second PIN code;
generating, using the at least one processor, print information, the print information including a job name, a user mode based on the results of the determination, the user mode indicating whether the user is registered or a guest user, and the output data;
when the results of the determination indicates that the user is registered, associate user identification information for identifying the user with the print information, and store the user identification information in memory;
when the results of the determination indicates that the user is the guest user, associate the data identification information with the print information, and store the data identification information in the memory,
notifying, using the at least one processor, the user of the data identification information via the network; and
transmitting, using the at least one processor, via the network, the print information associated with the user identification information or the data identification information based on the results of the determination, to at least one printer, the printer including a card reader, wherein
the printer is configured to authenticate the user based on the associated authentication information and information received from the card reader when the user mode indicates that the user is registered, and obtain from the memory the generated print information that is associated with the stored user identification information, and
authenticate the user based on the associated authentication information and a user input of the first PIN code when the user mode indicates that the user is the guest user, and obtain from the memory the generated print information that is associated with the stored data identification information.

10. The information processing method as claimed in claim 9, wherein
the data identification information is associated with the output data; and
the data identification information and the output data are stored in the memory, when the data identification information or a request to issue the data identification information is designated in the received mail.

11. The information processing method as claimed in claim 10, further comprising:

determining, using the at least one processor, whether the user identification information is to be associated with the output data from the user information stored in the memory, wherein
the user identification information is further associated with the output data, and the user identification information is stored, when the user identification information is determined,
the user information is associated with first identification information associated with one or more users and is stored in the memory, and
the determining includes determining the first identification information based on address information of a destination of the received mail, and determining the user identification information based on the user information associated with the determined first identification information.

12. The information processing method as claimed in claim 11, further comprising:
receiving, using the at least one processor, the first identification information from a terminal via the network, wherein
the notifying includes, transmitting the data identification information when stored first identification information stored in the memory is the same as the received first identification information or when, in the determining, the first identification information is determined by using the address information of the destination.

13. The information processing method as claimed in claim 12, further comprising:
receiving, using the at least one processor, the first identification information and the user identification information from the terminal via the network, wherein
the receiving the output data further includes, receiving the output data from the terminal via the network, and
the determining further includes, determining the user identification information from an address information of a sender and the address information of the destination when the mail is received, and
the determining further includes, determining the user identification information is determined from the stored user information using the received first identification information and the received user identification information when the output data is received from the terminal in the receiving output data.

14. The information processing method as claimed in claim 9, further comprising:
receiving, using the at least one processor, the data identification information via the network, wherein
the data identification information is associated with the output data, and the data identification information and the output data are stored in the memory, when second data identification information as the received data identification information.

15. The information processing method as claimed in claim 9, wherein the data identification information is included in the received mail.

16. The information processing method as claimed in claim 9, further comprising:
based on results of the authentication,
displaying, using the at least one processor, a list of job names associated with the authenticated user, and
receiving, using the at least one processor, an input from the authenticated user regarding a selected job name from the list of job names to print.

17. A non-transitory computer readable information recording medium storing computer executable instructions, which when executed by at least one processor, causes the at least one processor to:
- receive, via a network, a mail from a user, the mail including output data;
- determine whether the user is registered using data identification information or an address associated with the received mail, the data identification information being a first PIN code generated in response to the receiving of the mail or associated with the registered user;
- associate the output data with authentication information based on results of the determination, the association including retrieving a user identification information and password and/or generating a second PIN code;
- generate print information, the print information including a job name, a user mode based on the results of the determination, the user mode indicating whether the user is registered or a guest user, and the output data;
- when the results of the determination indicates that the user is registered, associate user identification information for identifying the user with the print information, and store the user identification information in memory;
- when the results of the determination indicates that the user is the guest user, associate the data identification information with the print information, and store the data identification information in the memory;
- notify the user of the data identification information via the network; and
- transmit, via the network, the print information associated with the user identification information or the data identification based on the results of the determination, to at least one printer, the printer including a card reader, wherein the printer is configured to,
- authenticate the user based on the associated authentication information and information received from the card reader when the user mode indicates that the user is registered, and obtain from the memory the generated print information that is associated with the stored user identification information, and
- authenticate the user based on the associated authentication information and a user input of the first PIN code when the user mode indicates that the user is the guest user, and obtain from the memory the generated print information that is associated with the stored data identification information.

18. The non-transitory computer readable information recording medium as claimed in claim 17, wherein the data identification information is included in the received mail.

19. The non-transitory computer readable information recording medium as claimed in claim 17, wherein the at least one processor is further caused to:
- based on results of the authentication,
  - display a list of job names associated with the authenticated user, and
  - receive an input from the authenticated user regarding a selected job name from the list of job names to print.

* * * * *